US007570921B2

(12) United States Patent
Sugar et al.

(10) Patent No.: US 7,570,921 B2
(45) Date of Patent: Aug. 4, 2009

(54) SYSTEMS AND METHODS FOR IMPROVING RANGE FOR MULTICAST WIRELESS COMMUNICATION

(75) Inventors: Gary L. Sugar, Rockville, MD (US); Chandra Vaidyanathan, Bethesda, MD (US)

(73) Assignee: IPR Licensing, Inc., Wilmington, DE (US)

( * ) Notice: Subject to any disclaimer, the term of this patent is extended or adjusted under 35 U.S.C. 154(b) by 845 days.

(21) Appl. No.: 10/855,279

(22) Filed: May 27, 2004

(65) Prior Publication Data

US 2004/0219937 A1  Nov. 4, 2004

Related U.S. Application Data

(62) Division of application No. 10/174,690, filed on Jun. 19, 2002, now Pat. No. 6,862,456.

(60) Provisional application No. 60/361,055, filed on Mar. 1, 2002, provisional application No. 60/365,774, filed on Mar. 21, 2002.

(51) Int. Cl.
*H04B 1/00* (2006.01)
*H04B 15/00* (2006.01)

(52) U.S. Cl. ............... 455/63.4; 455/510; 455/41.2; 455/562.1

(58) Field of Classification Search ............ 455/562.1, 455/510, 509, 41.2, 63.4, 69
See application file for complete search history.

(56) References Cited

U.S. PATENT DOCUMENTS 4,121,221 A    10/1978   Meadows 4,599,734 A    7/1986   Yamamoto
4,639,914 A    1/1987   Winters
4,811,420 A *  3/1989   Avis et al. ............... 455/502

(Continued)

FOREIGN PATENT DOCUMENTS

WO    01/45300    6/2001

(Continued)

OTHER PUBLICATIONS

Iserte et al., "Pre-and Post-Beamforming in MIMO Channels Applied to HIPERLAN/2 and OFDM", IST Summit 2001, IST Mobile Communications Summit, Sep. 2001.

(Continued)

*Primary Examiner*—Edward Urban
*Assistant Examiner*—RuiMeng Hu
(74) *Attorney, Agent, or Firm*—Volpe & Koenig, P.C.

(57) ABSTRACT

Methods to optimize range of multicast signal communication in wireless communication applications that use range-enhanced techniques for directed signal communication. A multicast signal may be sent multiple times through each of a plurality of independent omnidirectional transmit antennas of a communication device to a plurality of other communication devices to improve packet error rate (PER) at a given range (i.e., SNR). More generally, the multicast message can be transmitted up to N times using up to N times using any set of N complex linearly independent N-dimensional transmit weight vectors $v_i, \ldots, v_N$ associated with N plurality of transmit antennas that meets the power constraint $\|v_i\|^2=1$, $i=0, \ldots, N-1$, where the vector $v_i$, is used for the ith transmission of the multicast signal.

12 Claims, 9 Drawing Sheets

U.S. PATENT DOCUMENTS

| | | |
|---|---|---|
| 5,274,844 A | 12/1993 | Harrison et al. |
| 5,394,435 A | 2/1995 | Weerackody |
| 5,437,055 A | 7/1995 | Wheatley, III |
| 5,457,808 A | 10/1995 | Osawa et al. |
| 5,491,723 A | 2/1996 | Diepstraten |
| 5,493,307 A | 2/1996 | Tsujimoto |
| 5,493,722 A * | 2/1996 | Gunn et al. .................. 455/517 |
| 5,507,035 A | 4/1996 | Bantz et al. |
| 5,539,832 A | 7/1996 | Weinstein et al. |
| 5,570,366 A | 10/1996 | Baker et al. |
| 5,577,265 A | 11/1996 | Wheatley, III |
| 5,610,617 A | 3/1997 | Gans et al. |
| 5,621,732 A * | 4/1997 | Osawa ........................ 370/346 |
| 5,752,173 A | 5/1998 | Tsujimoto |
| 5,761,193 A | 6/1998 | Derango et al. |
| 5,761,237 A | 6/1998 | Petersen et al. |
| 5,771,462 A * | 6/1998 | Olsen ......................... 455/524 |
| 5,812,531 A | 9/1998 | Cheung et al. |
| 5,848,105 A | 12/1998 | Gardner et al. |
| 5,854,611 A | 12/1998 | Gans et al. |
| 5,898,679 A | 4/1999 | Brederveld et al. |
| 5,912,921 A | 6/1999 | Warren et al. |
| 5,924,020 A | 7/1999 | Forssen et al. |
| 5,930,248 A | 7/1999 | Langlet et al. |
| 5,982,327 A | 11/1999 | Vook et al. |
| 6,008,760 A | 12/1999 | Shattil |
| 6,018,642 A * | 1/2000 | Adachi ....................... 340/7.33 |
| 6,023,625 A | 2/2000 | Myers, Jr. |
| 6,037,898 A | 3/2000 | Parish et al. |
| 6,038,272 A | 3/2000 | Golden |
| 6,044,120 A | 3/2000 | Bar-David et al. |
| 6,058,105 A | 5/2000 | Hochwald et al. |
| 6,064,338 A | 5/2000 | Kobayakawa et al. |
| 6,091,934 A | 7/2000 | Berman et al. |
| 6,097,771 A | 8/2000 | Foschini |
| 6,118,788 A | 9/2000 | Kermani |
| 6,122,260 A | 9/2000 | Liu et al. |
| 6,124,824 A | 9/2000 | Xu et al. |
| 6,141,393 A | 10/2000 | Thomas et al. |
| 6,141,567 A | 10/2000 | Youssefmir et al. |
| 6,144,651 A | 11/2000 | Rinchiuso et al. |
| 6,144,711 A | 11/2000 | Raleigh et al. |
| 6,147,985 A | 11/2000 | Bar-David et al. |
| 6,157,340 A | 12/2000 | Xu et al. |
| 6,157,843 A | 12/2000 | Derango et al. |
| 6,177,906 B1 | 1/2001 | Petrus |
| 6,185,440 B1 | 2/2001 | Barratt et al. |
| 6,195,045 B1 | 2/2001 | Xu et al. |
| 6,211,671 B1 | 4/2001 | Shattil |
| 6,218,986 B1 | 4/2001 | Yukitomo et al. |
| 6,252,548 B1 | 6/2001 | Jeon |
| 6,252,884 B1 | 6/2001 | Hunter |
| 6,266,528 B1 | 7/2001 | Farzaneh |
| 6,295,026 B1 | 9/2001 | Chen et al. |
| 6,298,092 B1 | 10/2001 | Heath, Jr. |
| 6,307,882 B1 | 10/2001 | Marzetta |
| 6,317,466 B1 | 11/2001 | Foschini et al. |
| 6,327,310 B1 | 12/2001 | Hochwald et al. |
| 6,331,837 B1 | 12/2001 | Shattil |
| 6,349,219 B1 | 2/2002 | Hochwald et al. |
| 6,351,499 B1 | 2/2002 | Paulraj et al. |
| 6,362,781 B1 | 3/2002 | Thomas et al. |
| 6,369,758 B1 | 4/2002 | Zhang |
| 6,370,182 B2 | 4/2002 | Bierly et al. |
| 6,377,631 B1 | 4/2002 | Raleigh |
| 6,377,636 B1 | 4/2002 | Paulraj et al. |
| 6,377,819 B1 | 4/2002 | Gesbert et al. |
| 6,400,699 B1 | 6/2002 | Airy et al. |
| 6,400,780 B1 | 6/2002 | Rashid-Farrokhi et al. |
| 6,442,214 B1 | 8/2002 | Boleskei et al. |
| 6,462,709 B1 | 10/2002 | Choi |
| 6,463,295 B1 | 10/2002 | Yun |
| 6,473,467 B1 | 10/2002 | Wallace et al. |
| 6,522,898 B1 * | 2/2003 | Kohno et al. .............. 455/562.1 |
| 6,549,786 B2 | 4/2003 | Cheung |
| 6,570,929 B1 | 5/2003 | Eriksson |
| 6,584,161 B2 | 6/2003 | Hottinen |
| 6,625,162 B2 * | 9/2003 | Myojo et al. ................. 370/445 |
| 6,636,568 B2 | 10/2003 | Kadous |
| 6,646,600 B2 | 11/2003 | Vail et al. |
| 6,684,064 B2 | 1/2004 | Kazakevich et al. |
| 6,687,492 B1 | 2/2004 | Sugar et al. |
| 6,728,294 B1 | 4/2004 | Kohno et al. |
| 6,728,517 B2 | 4/2004 | Sugar et al. |
| 6,792,033 B1 | 9/2004 | Maruta et al. |
| 6,862,271 B2 | 3/2005 | Medvedev et al. |
| 6,873,606 B2 | 3/2005 | Agrawal et al. |
| 6,873,651 B2 | 3/2005 | Tesfai et al. |
| 6,888,878 B2 | 5/2005 | Prysby et al. |
| 6,895,255 B1 * | 5/2005 | Bridgelall ................. 455/552.1 |
| 6,901,122 B2 | 5/2005 | Nadgauda et al. |
| 6,904,021 B2 * | 6/2005 | Belcea ....................... 370/252 |
| 6,940,917 B2 | 9/2005 | Menon et al. |
| 6,956,907 B2 | 10/2005 | Ketchum |
| 6,961,545 B2 * | 11/2005 | Tehrani et al. .............. 455/101 |
| 6,963,742 B2 | 11/2005 | Boros et al. |
| 6,970,682 B2 * | 11/2005 | Crilly et al. .................. 455/78 |
| 6,980,600 B1 | 12/2005 | Ratnarajah |
| 6,983,167 B2 * | 1/2006 | Adachi et al. .............. 455/522 |
| 7,027,536 B1 | 4/2006 | Al-Dhahir |
| 7,031,368 B1 | 4/2006 | Maruta et al. |
| 7,042,860 B2 * | 5/2006 | Kasami et al. .............. 370/334 |
| 7,155,231 B2 | 12/2006 | Burke et al. |
| 7,224,758 B1 | 5/2007 | Banister |
| 7,224,942 B2 | 5/2007 | Dent |
| 7,230,940 B2 * | 6/2007 | Fantaske ..................... 370/338 |
| 7,277,409 B1 * | 10/2007 | Thermond et al. .......... 370/328 |
| 7,340,279 B2 * | 3/2008 | Chen et al. ................ 455/562.1 |
| 7,342,875 B2 | 3/2008 | Hammons et al. |
| 2001/0012764 A1 | 8/2001 | Edwards et al. |
| 2001/0015994 A1 | 8/2001 | Nam |
| 2001/0046255 A1 | 11/2001 | Shattil |
| 2001/0053143 A1 | 12/2001 | Li et al. |
| 2001/0053699 A1 * | 12/2001 | McGrady et al. ............ 455/513 |
| 2002/0001316 A1 | 1/2002 | Hornsby et al. |
| 2002/0024975 A1 | 2/2002 | Hendler |
| 2002/0034191 A1 | 3/2002 | Shattil |
| 2002/0039884 A1 | 4/2002 | Raynes et al. |
| 2002/0045435 A1 * | 4/2002 | Fantaske ..................... 455/403 |
| 2002/0051430 A1 * | 5/2002 | Kasami et al. .............. 370/319 |
| 2002/0064246 A1 | 5/2002 | Kelkar et al. |
| 2002/0067309 A1 | 6/2002 | Baker et al. |
| 2002/0072392 A1 | 6/2002 | Awater et al. |
| 2002/0085643 A1 | 7/2002 | Kitchener et al. |
| 2002/0102950 A1 | 8/2002 | Gore et al. |
| 2002/0111142 A1 | 8/2002 | Klimovitch |
| 2002/0118781 A1 | 8/2002 | Thomas et al. |
| 2002/0122383 A1 | 9/2002 | Wu et al. |
| 2002/0122501 A1 | 9/2002 | Awater et al. |
| 2002/0127978 A1 | 9/2002 | Khatri |
| 2002/0136170 A1 | 9/2002 | Struhsaker |
| 2002/0141355 A1 | 10/2002 | Struhsaker et al. |
| 2002/0147032 A1 | 10/2002 | Yoon et al. |
| 2002/0158801 A1 * | 10/2002 | Crilly et al. ................. 342/378 |
| 2002/0159537 A1 | 10/2002 | Crilly, Jr. |
| 2002/0172186 A1 | 11/2002 | Larsson |
| 2002/0172269 A1 | 11/2002 | Xu |
| 2002/0196842 A1 | 12/2002 | Onggosanusi et al. |
| 2003/0002450 A1 | 1/2003 | Jalali et al. |
| 2003/0022693 A1 | 1/2003 | Gerogiokas et al. |
| 2003/0032423 A1 | 2/2003 | Boros et al. |
| 2003/0048761 A1 | 3/2003 | Jarett |
| 2003/0108117 A1 | 6/2003 | Ketchum et al. |
| 2003/0114108 A1 | 6/2003 | Frecassetti et al. |

| | | | |
|---|---|---|---|
| 2003/0125090 | A1 | 7/2003 | Zeira |
| 2003/0139194 | A1 | 7/2003 | Onggosanusi et al. |
| 2003/0157954 | A1 | 8/2003 | Medvedev et al. |
| 2003/0181165 | A1 | 9/2003 | Sugar et al. |
| 2004/0072546 | A1 | 4/2004 | Sugar et al. |
| 2004/0104839 | A1 | 6/2004 | Velazquez et al. |
| 2005/0192048 | A1* | 9/2005 | Bridgelall ............... 455/553.1 |
| 2007/0117513 | A1* | 5/2007 | Kasami et al. ............. 455/63.4 |

FOREIGN PATENT DOCUMENTS

| | | |
|---|---|---|
| WO | 02/03568 | 1/2002 |
| WO | 01/45300 | 6/2002 |

OTHER PUBLICATIONS

Iserte et al., "Joint Beamforming Strategies in OFDM-MIMO Systems", ICASSP 2002, IEEE International Conference on Acoustics, Speech and Signal Processing, May 2002.
Lee et al., "Antenna Diversity for an OFDM System in a Fading Channel", Proceeding of IEEE MILCOM 1999, Nov. 1999, pp. 1104-1109.
Jakes, "Microwave Mobile Communications", Copyright 1974, pp. 313-320 and pp. 489-498.
Briesemeister et al., "Role-Based Multicast in Highly Mobile but Sparsely Connect Ad-Hoc Networks"; First Annual Workshop on Mobile Ad Hoc Networking & Computing; pp. 45-50; Aug. 2000.
Bablan et al., "Optimum Diversity Combining and Equalization in Digital Data Transmission with Applications to Cellular Mobile Radio-Part II: Numerical Results"; May 1992; IEEE Transactions on Communications, vol. 30, No. 5; pp. 895-907.
Brunner et al., "Downlink Beamforming for WCDMA Based on Uplink Channel Parameters"; Proceedings of 3$^{rd}$ European Personal Mobile Conference (EPMCC '99), Mar. 1999, pp. 334-339.
Yeh, "An Analysis of Adaptive Retransmission Arrays in a Fading Environment", The Bell System Technical Journal, Oct. 1970, pp. 1811-1825.
Morgan, "Interaction of Adaptive Antenna Arrays in an Arbitrary Environment", The Bell System Technical Journal, Jan. 1965, pp. 23-47.
Stridh et al., "MIMO Channel Capacity on a Measured Indoor Radio Channel at 5.8 GHz", Proc. of the Asilomar Conf. on Signals, Systems & Computers, vol. 1, Oct. 2000, pp. 733-737.
Aziz et al., "Indoor Throughput and Range Improvements Using Standard Complaint AP Antenna Diversity in IEEE 802.11a and ETSI HIPERLAN/2", Vehicular Technology Conference, 2002, VTC 2001, Oct. 7-11, 2001, IEEE VTS 54$^{th}$, vol. 4, pp. 2294-2298.
Iserte et al., "Iterative Algorithm for the Estimation of Distributed Sources Localization Parameters", SSP 2001, 11$^{th}$ IEEE Workshop on Statistical Signal Processing, Aug. 2001.
Vaidyanathan et al., "The Role In Lossless Systems in Modern Digital Signal Processing: A Tutorial", IEEE Transactions on Education, vol. 32, Aug. 1989, pp. 181-197.
Raleigh et al., "Spatio-Temporal Coding for Wireless Communication", IEEE Transactions on Communications, vol. 46, No. 3, Mar. 1998, pp. 357-366.
Jungnickel et al., "Performance of a MIMO System with Overlay Pilots", IEEE GlobeCom 2001, pp. 594-598.
"BLAST High-Level Overview", Lucent Technologies, Jul. 18, 2000.
Golden et al., "Detection Algorithm and Initial Laboratory Results Using V-BLAST Space-Time Communication Architecture", Electronic Letters, Jan. 7, 1999, vol. 35, No. 1.
Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.
Chizhik et al., "Keyholes, Correlations, and Capacities of Multielement Transmit and Receiver Antennas", IEEE Transactions on Wireless Communications, vol. 1, No. 2, Apr. 2002, pp. 361-368.
Junqiang et al., "Spatial Multiuser Access with MIMO Smart Antennas for OFDM Systems", IEEE VTC 2001, Sep. 2001, pp. 1553-1557.
Jungnickel et al., "A MIMO WLAN Based on Linear Channel Inversion", IEE Seminar-MIMO Communication Systems from Concept TO Implementation, Dec. 2001, pp. 20/1-20/6.
Stridh et al., "Spatial Characterization of Indoor Radio Channel Measurements at 5 GHz", SAM 2000, Mar. 2000, pp. 58-62.
Irner et al., "MISO Concepts for Frequency-Selective Channels", 2002 International Zurich Seminar on Broadband Communications Access, Feb. 19-21, 2002.
Choi et al., "MISO CDMA Transmission with Simplified Receiver for Wireless Communication Handsets", IEEE Transactions on Communications, vol. 49, No. 5, May 2002.
Meyer-Ottens, et al. "Downlink Beamforming for W-CDMA Using Feedback and Interference Estimate", Mar. 9, 2001.
Brunner, et al., "Downlink Beamforming for WCDMA Based on Uplink Channel Parameters", Proc. EPMCC 1999, pp. 375-380, Mar. 1999.
Yang et al., "On Joint Transmitter and Receive Optimization for Multiple-Input-Multiple-Output (MIMO) Transmission Systems", IEEE Transactions on Communications, vol. 42, No. 12, Dec. 1994.
Ivrlac et al., "On Channel Capacity of Correlated MIMO Channels", ITG Fokusprojekt: Mobilkommunikation "Systeme mit Intelligenten Antennen", Ilmenau, 2001.
Chuah et al., "Capacity of Multi-Antenna Array Systems in Indoor Wireless Environment", Nov. 1998, IEEE Globecom.
Wallace et al., "Experimental Characterization of the MIMO Wireless Channel: Data Acquisition and Analysis", Feb. 27, 2002, Department of Electrical and Computer Engineering, Brigham Young University.
Love et al., "Equal Gain Transmission in Multiple-Input Multiple-Output Wireless Systems", Nov. 2002, Proceedings of IEEE Globecom, pp. 1124-1128.
Lucent Technologies, "Lucent Technologies: Chips Poised to Bring 'BLAST' Multiple Input/Multiple Output Technology to Laptops, PDAs and Other Mobile Devices", Oct. 16, 2002, lucent.com.
"Lucent's 'BLAST' Chips to Take Off in Wireless Market", EETimes.com, Oct. 16, 2002.
Heath et al., "A Simple Scheme for Transmit Diversity Using Partial Channel Feedback", Signals, Systems & Computers, Conference Record of the Thirty-Second Asilomar Conference, Nov. 1-4, 1998; vol. 2; pp. 1073-1078.
Chiu et al., "OFDM Receiver Design", EE225C, Fall 2000, University of California, Berkeley.
Walniansky et al., "V-BLAST: An Architecture for Realizing Very High Data Rates Over the Rich-Scattering Wireless Channel", Proc. ISSSE-98, Pisa, Italy, Sep. 29, 1998.
Sanchez et al., "CSMA/CA Beam Forming Antennas in Multi-hop Packet Radio"; Proc. For Swedish Workshop on Wireless Ad-Hoc Networks, Mar. 5-6, 2001.
"BLAST High-Level Overview", Lucent Technologies, Jul. 18, 2000.
"Lucent's 'BLAST' Chips to Take Off in Wireless Market", EETimes.com, Oct. 16, 2002.
Ariyavisitakul et al., "Optimum Space-Time Processors With Dispersive Interference—Unified Analysis And Required Filter Span", 1999 IEEE International Conference On Communications, vol. 2, pp. 1244-1249, (1999).
Aziz et al., "Indoor Throughput and Range Improvements Using Standard Complaint AP Antenna Diversity in IEEE 802.11a and ETSI HIPERLAN/2", Vehicular Technology Conference, 2002, VTC 2001, Oct. 7-11, 2001, IEEE VTS 54$^{th}$, vol. 4, pp. 2294-2298.
Bablan et al., "Optimum Diversity Combining and Equalization in Digital Data Transmission with Applications to Cellular Mobile Radio-Part II: Numerical Results"; May 1992; IEEE Transactions on Communications, vol. 30, No. 5; pp. 895-907.
Briesemeister et al., "Role-Based Multicast in Highly Mobile but Sparsely Connect Ad-Hoc Networks"; First Annual Workshop on Mobile Ad Hoc Networking & Computing; pp. 45-50; Aug. 2000.
Brunner et al., "Downlink Beamforming for WCDMA Based on Uplink Channel Parameters"; Proceedings of 3$^{rd}$ European Personal Mobile Conference (EPMCC '99), Mar. 1999, pp. 375-380.
Chiu et al., "OFDM Receiver Design", EE225C, Fall 2000, University of California, Berkeley.

Chizhik et al., "Keyholes, Correlations, and Capacities of Multielement Transmit and Receiver Antennas", IEEE Transactions on Wireless Communications, vol. 1, No. 2, Apr. 2002, pp. 361-368.

Choi et al., "MISO CDMA Transmission with Simplified Receiver for Wireless Communication Handsets", IEEE Transactions on Communications, vol. 49, No. 5, May 2002.

Chuah et al., "Capacity of Multi-Antenna Array Systems in Indoor Wireless Environment", Nov. 1998, IEEE Globecom.

Golden et al., "Detection Algorithm and Initial Laboratory Results Using V-BLAST Space-Time Communication Architecture", Electronic Letters, Jan. 7, 1999, vol. 35, No. 1.

Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.

Golub et al., *Matrix Computation*, "7.3 Power Iterations", The Johns Hopkins University Press, Second Edition. pp. 351, (1983).

Heath et al., "A Simple Scheme for Transmit Diversity Using Partial Channel Feedback", Signals, Systems & Computers, Conference Record of the Thirty-Second Asilomar Conference, Nov. 1-4, 1998; vol. 2; pp. 1073-1078.

Irmer et al., "MISO Concepts for Frequency-Selective Channels", 2002 International Zurich Seminar on Broadband Communications Access, Feb. 19-21, 2002.

Iserte et al., "Iterative Algorithm for the Estimation of Distributed Sources Localization Parameters", SSP 2001, 11$^{th}$ IEEE Workshop on Statistical Signal Processing, Aug. 2001.

Iserte et al., "Joint Beamforming Strategies in OFDM-MIMO Systems", ICASSP 2002, IEEE International Conference on Acoustics, Speech and Signal Processing, May 2002.

Iserte et al., "Pre-and Post-Beamforming in MIMO Channels Applied to HIPERLAN/2 and OFDM", IST Summit 2001, IST Mobile Communications Summit, Sep. 2001.

Ivrlac et al., "On Channel of Correlated MIMO Channels", ITG Fokusprojekt: Mobilommunikation "Systeme mit Intelligenten Antennen", Ilmenau, 2001.

Jakes, "Microwave Mobile Communications", Copyright 1974, pp. 313-320 and pp. 489-498.

Jungnickel et al., "A MIMO WLAN Based on Linear Channel Inversion", IEE Seminar-MIMO Communication Systems from Concept TO Implementation, Dec. 2001, pp. 20/1-20/6.

Jungnickel et al., "Performance of a MIMO System with Overlay Pilots", IEEE GlobeCom 2001, pp. 594-598.

Junqiang et al., "Spatial Multiuser Access with MIMO Smart Antennas for OFDM Systems", IEEE VTC 2001, Sep. 2001, pp. 1553-1557.

LAN MAN Standards Committee Of The IEEE Computer Society, "Information Technology—Telecommunications And Information Exchange Between Systems—Local And Metropolitan Area Networks—Specific Requirements—Part 11: Wireless LAN Medium Access Control (MAC) And Physical Layer (PHY) Specifications", ANSI/IEEE Std 802.11, 1999 Edition (R2003), (Reaffirmed Jun. 12, 2003).

Lee et al., "Antenna Diversity for an OFDM System in a Fading Channel", Proceeding of IEEE MILCOM 1999, Nov. 1999, pp. 1104-1109.

Li et al., "Adaptive Antenna Arrays For OFDM Systems With Cochannel Interference", IEEE Transactions On Communications, vol. 47, No. 2, pp. 217-229, (Feb. 1999).

Love et al., "Equal Gain Transmission in Multiple-Input Multiple-Output Wireless Systems", Nov. 2002, Proceeedings of IEEE Globecom, pp. 1124-1128.

Lucent Technologies, "Lucent Technologies: Chips Poised to Bring 'BLAST' Multiple Input/Multiple Output Technology to Laptops, PDAs and Other Mobile Devices", Oct. 16, 2002, lucent.com.

Meyer-Ottens, et al. "Downlink Beamforming for W-CDMA Using Feedback and Interference Estimate", Mar. 9, 2001.

Morgan, "Interaction of Adaptive Antenna Arrays in an Arbitrary Environment", The Bell System Technical Journal, Jan. 1965, pp. 23-47.

Narula et al., "Efficient Use Of Side Information in Multiple-Antenna Data Transmission Over Fading Channels", IEEE Journal On Selected Areas In Communications, vol. 16, No. 8, pp. 1423-1436, (Oct. 1998).

Onggosanusi et al., "Performance Analysis Of Closed-Loop Transmit Diversity In The Presence Of Feedback Delay", IEEE Transactions On Communications, vol. 49, No. 9, pp. 1618-1630, (Sep. 2001).

Raleigh et al., "Spatio-Temporal Coding for Wireless Communication", IEEE Transactions on Communications, vol. 46, No. 3, Mar. 1998, pp. 357-366.

Sanchez et al., "CSMA/CA Beam Forming Antennas in Multi-hop Packet Radio"; Proc. For Swedish Workshop on Wireless Ad-Hoc Networks, Mar. 5-6, 2001.

Stridh et al., "MIMO Channel Capacity on a Measured Indoor Radio Channel at 5.8 GHz", Proc. of the Asilomar Conf. in Signals, Systems & Computers, vol. 1, Oct. 2000, pp. 733-737.

Stridh et al., "Spatial Characterization of Indoor Radio Channel Measurements at 5 GHz", SAM 2000, Mar. 2000, pp. 58-62.

Vaidayanathan et al., "The Role In Lossless Systems in Modern Digital Signal Processing: A Tutorial", IEEE Transactions on Education, vol. 32, Aug. 1989, pp. 181-197.

Wallace et al., "Experimental Characterization of the MIMO Wireless Channel: Data Acquisition and Analysis", Feb. 27, 2002, Department of Electrical and Computer Engineering, Brigham Young University.

Wennström et al., "On The Optimality And Performance Of Transmit And Receive Space Diversity In MIMO Channels", IEEE Seminar on Communications Systems from Concept to Implementations, (Dec. 12, 2001).

Wolniansky et al., "V-BLAST: An Architecture for Realizing Very High Data Rates Over the Rich-Scattering Wireless Channel", Proc. ISSSE-98, Pisa, Italy, Sep. 29, 1998.

Yang et al., "Joint Transmitter—Receiver Optimization For Multi-Input Multi-Output Systems With Decision Feedback", IEEE Transactions On Information Theory, vol. 40, No. 5, pp. 1334-1347, (Sep. 1994).

Yang et al., "On Joint Transmitter and Receive Optimization for Multiple-Input-Multiple-Output (MIMO) Transmission Systems", IEEE Transactions on Communications, vol. 42, No. 12, Dec. 1994.

Yeh, "An Analysis of Adaptive Retransmission Arrays in a Fading Environment", The Bell System Technical Journal, Oct. 1970, pp. 1811-1825.

"BLAST High-Level Overview", Lucent Technologies, Jul. 18, 2000.

"Lucent's 'BLAST' Chips to Take Off in Wireless Market", EETimes.com, Oct. 16, 2002.

Ariyavisitakul et al., "Optimum Space-Time Processors With Dispersive Interference—Unified Analysis And Required Filter Span", 1999 IEEE International Conference On Communications, vol. 2, pp. 1244-1249, (1999).

Aziz et al., "Indoor Throughput and Range Improvements Using Standard Complaint AP Antenna Diversity in IEEE 802.11a and ETSI HIPERLAN/2", Vehicular Technology Conference, 2002, VTC 2001, IEEE VTS 54$^{th}$, vol. 4, pp. 2294-2298.

Bablan et al., "Optimum Diversity Combining and Equalization in Digital Data Transmission with Applications to Cellular Mobile Radio-Part II: Numerical Results"; May 1992; IEEE Transactions on Communications, vol. 30, No. 5; pp. 895-907.

Briesemeister et al., "Role-Based Multicast in Highly Mobile but Sparsely Connect Ad-Hoc Networks"; First Annual Workshop on Mobile Ad Hoc Networking & Computing; pp. 45-50; Aug. 2000.

Brunner et al., "Downlink Beamforming for WCDMA Based on Uplink Channel Parameters"; Proceedings of 3$^{rd}$ European Personal Mobile Conference (EPMCC '99), Mar. 1999, pp. 375-380.

Chiu et al., "OFDM Receiver Design", EE225C, Fall 2000, University of California, Berkeley.

Chiznik et al., "Keyholes, Correlations, and Capacities of Multielement Transmit and Receiver Antennas", IEEE Transactions on Wireless Communications, vol. 1, No. 2, Apr. 2002, pp. 361-368.

Choi et al., "MISO CDMA Transmission with Simplified Receiver for Wireless Communication Handsets", IEEE Transactions on Communications, vol. 49, No. 5, May 2002.

Chuah et al., "Capacity of Multi-Antenna Array Systems in Indoor Wireless Environment", Nov. 1998, IEEE Globecom.

Golden et al., "Detection Algorithm and Initial Laboratory Results Using V-BLAST Space-Time Communication Architecture", Electronic Letters, Jan. 7, 1999, vol. 35, No. 1.

Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.

Golub et al., *Matrix Computation*, "7.3 Power Iterations", The Johns Hopkins University Press, Second Edition, pp. 351, (1983).

Heath et al., "A Simple Scheme for Transmit Diversity Using Partial Channel Feedback", Signals, Systems & Computers, Conference Record of the Thirty-Second Asilomar Conference, Nov. 1-4, 1998; vol. 2; pp. 1073-1078.

Irmer et al., "MISO Concepts for Frequency-Selective Channels", 2002 International Zurich Seminar on Broadband Communications Access, Feb. 19-21, 2002.

Iserte et al., "Iterative Algorithm for the Estimation of Distributed Sources Localization Parameters", SSP 2001, 11th IEEE Workshop on Statistical Signal Processing, Aug. 2001.

Iserte et al., "Joint Beamforming Strategies in OFDM-MIMO Systems", ICASSP 2002, IEEE International Conference on Acoustics, Speech and Signal Processing, May 2002.

Iserte et al., "Pre-and Post-Beamforming in MIMO Channels Applied to HIPERLAN/2 and OFDM", IST Summit 2001, IST Mobile Communications Summit, Sep. 2001.

Ivrlac et al., "On Channel Capacity of Correlated MIMO Channels", ITG Fokusprojekt: Mobilkommunikation "Systeme mit Intelligenten Antennen", Ilmenau, 2001.

Jakes, "Microwave Mobile Communications", Copyright 1974, pp. 313-320 and pp. 489-498.

Jungnickel et al., "A MIMO WLAN Based on Linear Channel Inversion", IEE Seminar-MIMO Communication Systems from Concept TO Implementation, Dec. 2001, pp. 20/1-20/6.

Jungnickel et al., "Performance of a MIMO System with Overlay Pilots", IEEE GlobeCom 2001, pp. 594-598.

Junqiang et al., "Spatial Multiuser Access with MIMO Smart Antennas for OFDM Systems", IEEE VTC 2001, Sep. 2001, pp. 1553-1557.

LAN MAN Standards Committee Of The IEEE Computer Society, "Information Technology—Telecommunications And Information Exchange Between Systems—Local And Metropolitan Area Networks—Specific Requirements—Part 11: Wireless LAN Medium Access Control (MAC) And Physical Layer (PHY) Specifications", ANSI/IEEE Std 802.11, 1999 Edition (R2003), (Reaffirmed Jun. 12, 2003).

Lee et al., "Antenna Diversity for an OFDM System in a Fading Channel", Proceeding of IEEE MILCOM 1999, Nov. 1999, pp. 1104-1109.

Li et al., "Adaptive Antenna Arrays For OFDM Systems With Cochannel Interference", IEEE Transactions On Communications, vol. 47, No. 2, pp. 217-229, (Feb. 1999).

Love et al., "Equal Gain Transmission in Multiple-Input Multiple-Output Wireless Systems", Nov. 2002, Proceedings of IEEE Globecom, pp. 1124-1128.

Lucent Technologies, "Lucent Technologies: Chips Poised to Bring 'BLAST' Multiple Input/Multiple Output Technology to Laptops, PDAs and Other Mobile Devices", Oct. 16, 2002, lucent.com.

Meyer-Ottens, et al. "Downlink Beamforming for W-CDMA Using Feedback and Interference Estimate", Mar. 9, 2001.

Morgan, "Interaction of Adaptive Antenna Arrays in an Arbitrary Environment", The Bell System Technical Journal, Jan. 1965, pp. 23-47.

Narula et al., "Efficient Use Of Side Information In Multiple-Antenna Data Transmission Over Fading Channels", IEEE Journal On Selected Areas In Communications, vol. 16, No. 8, pp. 1423-1436, (Oct. 1998).

Onggosanusi et al., "Performance Analysis Of Closed-Loop Transmit Diversity In The Presence Of Feedback Delay", IEEE Transactions On Communications, vol. 49, No. 9, pp. 1618-1630, (Sep. 2001).

Raleigh et al., "Spatio-Temporal Coding for Wireless Communication", IEEE Transactions on Communications, vol. 46, No. 3, Mar. 1998, pp. 357-366.

Sanchez et al., "CSMA/CA Beam Forming Antennas in Multi-hop Packet Radio"; Proc. For Swedish Workshop on Wireless Ad-Hoc Networks, Mar. 5-6, 2001.

Stridh et al., "MIMO Channel Capacity on a Measured Indoor Radio Channel at 5.8 GHz", Proc. of the Asilomar Conf. on Signals, Systems & Computers, vol. 1, Oct. 2000, pp. 733-737.

Stridh et al., "Spatial Characterization of Indoor Radio Channel Measurements at 5 GHz", SAM 2000, Mar. 2000, pp. 58-62.

Vaidyanathan et al., "The Role In Lossless Systems in Modern Digital Signal Processing: A Tutorial", IEEE Transactions on Education, vol. 32, Aug. 1989, pp. 181-197.

Wallace et al., "Experimental Characterization of the MIMO Wireless Channel: Data Acquisition and Analysis", Feb. 27, 2002, Department of Electrical and Computer Engineering, Brigham Young University.

Wennström et al., "On The Optimality And Performance Of Transmit And Receive Space Diversity In MIMO Channels", IEEE Seminar on Communications Systems from Concept to Implementations, (Dec. 12, 2001).

Wolniansky et al., "V-BLAST: An Architecture for Realizing Very High Data Rates Over the Rich-Scattering Wireless Channel", Proc. ISSSE-98, Pisa, Italy, Sep. 29, 1998.

Yang et al., "Joint Transmitter—Receiver Optimization For Multi-Input Multi-Output Systems With Decision Feedback", IEEE Transactions On Information Theory, vol. 40, No. 5, pp. 1334-1347, (Sep. 1994).

Yang et al., "On Joint Transmitter and Receive Optimization for Multiple-Input-Multiple-Output (MIMO) Transmission Systems", IEEE Transactions on Communications, vol. 42, No. 12, Dec. 1994.

Yeh, "An Analysis of Adaptive Retransmission Arrays in a Fading Environment", The Bell System Technical Journal, Oct. 1970, pp. 1811-1825.

"BLAST High-Level Overview", Lucent Technologies, Jul. 18, 2000.

"Lucent's 'BLAST' Chips to Take Off in Wireless Market", EETimes.com, Oct. 16, 2002.

Ariyavisitakul et al., "Optimum Space-Time Processors With Dispersive Interference - Unified Analysis And Required Filter Span", 1999 IEEE International Conference On Communications, vol. 2, pp. 1244-1249, (1999).

Aziz et al., "Indoor Throughput and Range Improvement Using Standard Complaint AP Antenna Diversity in IEEE 802.11a and ETSI HIPERLAN/2", Vehicular Technology Conference, 2002, VTC 2001, Oct. 7-11, 2001, IEEE VTS 54th, vol. 4, pp. 2294-2298.

Bablan et al., "Optimum Diversity Combining and Equalization in Digital Data Transmission with Applications to Cellular Mobile Radio-Part II: Numerical Results"; May 1992; IEEE Transactions on Communications, vol. 30, No. 5; pp. 895-907.

Briesemeister et al., "Role-Based Multicast in Highly Mobile but Sparsely Connect Ad-Hoc Networks"; First Annual Workshop on Mobile Ad Hoc Networking & Computing; pp. 45-50; Aug. 2000.

Brunner et al., "Downlink Beamforming for WCDMA Based on Uplink Channel Parameters"; Proceedings of 3rd European Personal Mobile Conference (EPMCC '99), Mar. 1999, pp. 375-380.

Chiu et al., " OFDM Receiver Design", EE225C, Fall 2000, University of California, Berkeley.

Chizhik et al., "Keyholes, Correlations, and Capacities of Multielement Transmit and Receiver Antennas", IEEE Transactions on Wireless Communications, vol., 1, No. 2, Apr. 2002, pp. 361-368.

Choi et al., "MISO CDMA Transmission with Simplified Receiver for Wireless Communication Handsets", IEEE Transactions on Communications, vol. 49, No. 5, May 2002.

Chuah et al., "Capacity of Multi-Antenna Array Systems in Indoor Wireless Environment", Nov. 1998, IEEE Globecom.

Golden et al., "Detection Algorithm and Initial Laboratory Results Using V-BLAST Space-Time Communications Architecture", Electronic Letters, Jan. 7, 1999, vol. 35, No. 1.

Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.

Golub et al., *Matrix Computation*, "7.3 Power Iterations", The Johns Hopkins University Press, Second Edition, p. 351, (1983).

Heath et al., "A Simple Scheme for Transmit Diversity Using Partial Channel Feedback", Signals, Systems & Computers, Conferecnce Record of the Thirty-Second Asilomar Conference, Nov. 1-4, 1998; vol. 2; pp. 1073-1078.

Irmer et al., "MISO Concepts for Frequency-Selective Channels", 2002 International Zurich Seminar on Broadband Communications Access, Feb. 19-21, 2002.

Iserte et al., "Iterative Algorithm for the Estimation of Distributed Sources Localization Parameters", SSP 2001, 11$^{th}$ IEEE Workshop on Statistical Signal Processing, Aug. 2001.

Iserte et al., "Joint Beamforming Strategies in OFDM-MIMO Systems", ICASSP 2002, IEEE International Conference on Acoustics, Speech and Signal Processing, May 2002.

Iserte et al., "Pre-and-Post-Beamforming in MIMO Channels Applied to HIPERLAN/2 and OFDM", IST Summit 2001, IST Mobile Communications Summit, Sep. 2001.

Ivrlac et al., "On Channel Capacity of Correlated MIMO Channels", ITG Fokusprojekt: Mobilkommunikation "Systeme mit Intelligenten Antennen", Ilmenau, 2001.

Jakes, "Microwave Mobile Communications", Copyright 1974, pp. 313-320 and pp. 489-498.

Jungnickel et al., "A MIMO WLAN Based on Linear Channel Inversion", IEE Seminar-MIMO Communication Systems from Concept TO Implementation, Dec. 2001, pp. 20/1-20/6.

Jungnickel et al., "Performance of a MIMO System with Overlay Pilots", IEEE GlobeCom 2001, pp. 594-598.

Junqiang et al., "Spatial Multiuser Access with MIMO Smart Antennas for OFDM Systems", IEEE VTC 2001, Sep. 2001, pp. 1553-1557.

LAN MAN Standards Committee Of The IEEE Computer Society, "Information Technology - Telecommunications And Information Exchange Between Systems - Local And Metropolitan Area Networks - Specific Requirements - Part 11: Wireless LAN Medium Access Control (MAC) And Physical Layer (PHY) Specifications", ANSI/IEEE Std 802.11, 1999 Edition (R2003), (Reaffirmed Jun. 12, 2003).

Lee et al., "Antenna Diversity for an OFDM System in a Fading Channel", Proceeding of IEEE MILCOM 1999, Nov. 1999, pp. 1104-1109.

Li et al., "Adaptive Antenna Arrays For OFDM Systems With Cochannel Interference", IEEE Transactions On Communications, vol. 47, no. 2, pp. 217-229, (Feb. 1999).

Love et al., "Equal Gain Transmission in Multiple-Input Multiple-Output Wireless Systems", Nov. 2002, Proceedings of IEEE Globecome, pp. 1124-1128.

Lucent Technologies, "Lucent Technologies: Chips Poised to Bring 'BLAST' Mulitple Input/Output Technology to Laptops, PDAs and Other Mobile Devices", Oct. 16 ,2002, lucent.com.

Meyer-Ottens, et al. "Dowwnlink Beamforming for W-CDMA Using Feedback and Interference Estimate", Mar. 9, 2001.

Morgan, "Interaction of Adaptive Antenna Arrays in an Arbitrary Environment", The Bell System Technical Journal, Jan. 1965, pp. 23-47.

Narula et al., "Efficient Use Of Side Information In Multiple-Antenna Data Transmission Over Fading Channels", IEEE Journal On Selected Areas In Communications, vol. 16, No. 8, pp. 1423-1436, (Oct. 1998).

Onggosanusi et al., "Performance Analysis Of Closed-Loop Transmit Diversity In The Presence Of Feedback Delay", IEEE Transactions On Communications, vol. 49, No. 9, pp. 1618-1630, (Sep. 2001).

Raleigh et al., "Spatio-Temporal Coding for Wireless Communication", IEEE Transactions on Communications, vol. 46, No. 3, Mar. 1998, pp. 357-366.

Sanchez et al., "CSMA/CA Beam Forming Antennas in Multi-hop Packet Radio"; Proc. For Swedich Workshop on Wireless Ad-Hoc Networks, Mar. 5-6, 2001.

Stridh et al., "MIMO Channel Capacity on a Measured Indoor Radio Channel at 5.8 GHz", Proc. of the Asilomar Conf. on Signals, Systems & Computers, vol. 1, Oct. 2000, pp. 733-737.

Stridh et al., "Spatial Characterization of Indoor Radio Channel Measurements at 5GHz", SAM 2000, Mar. 2000, pp. 58-62.

Vaidyanathan et al., "The Role In Lossless Systems in Modern Digital Signal Processing: A Tutorial", IEEE Transactions on Education, vol. 32, Aug. 1989, pp. 181-197.

Wallace et al., "Experimental Characterization of the MIMO Wireless Channel: Data Acquisition and Analysis", Feb. 27, 2002, Department of Electrical and Computer Engineering, Brigham Young University.

Wennstrom et al., "On The Optimality And Performance Of Transmit And Receive Space Diversity in MIMO Channels", IEEE Seminar on Communications Systems from Concept to Implementations, (Dec. 12, 2001).

Wolniansky et al., "V-BLAST: An Architecture for Realizing Very High Data Rates over the Rich-Scattering Wireless Channel", Proc. ISSSE-98, Pisa, Italy, Sep. 29, 1998.

Yang et al., "Joint Transmitter - Receiver Optimization For Multi-Input Multi-Output System With Decision Feedback", IEEE Transactions On Information Theory, vol. 40, No. 5, pp. 1334-1347, (Sep. 1994).

Yang et al., "On Joint Transmitter and Receive Optimization for Multiple-Input-Multiple-Output (MIMO) Transmission Systems", IEEE Transactions on Communications, vol. 42, No. 12, Dec. 1994.

Yeh, "An Analysis of Adaptive Retransmission Arrays in a Fading Environment", The Bell System Technical Journal, Oct. 1970, pp. 1811-1825.

\* cited by examiner

SYSTEMS AND METHODS FOR IMPROVING RANGE FOR MULTICAST WIRELESS COMMUNICATION

This application is a divisional of U.S. application Ser. No. 10/174,690, filed Jun. 19, 2002 now U.S. Pat. No. 6,862,456, which in turn claims priority to U.S. Provisional Application No. 60/361,055, filed Mar. 1, 2002 and to U.S. Provisional Application No. 60/365,774 filed Mar. 21, 2002, the entirety of both which are incorporated herein by reference.

BACKGROUND OF THE INVENTION

The present invention relates to enhancing the range in a wireless communication application where communication devices may transmit multicast signals as well as directed signals.

Composite Beamforming (CBF) is an antenna processing technique in which a first communication device, having a plurality of antennas, weights a signal to be transmitted by its antennas to a second communication device also having a plurality of antennas. Similarly, the second communication device weights and combines the received signals received by its antennas. The transmit weights and receive weights are determined to optimize the link margin between the devices, thereby significantly extending the range of communication between the two communication devices. Techniques related to composite beamforming are the subject matter of commonly assigned co-pending applications filed on even date and entitled "System and Method for Antenna Diversity Using Joint Maximal Ratio Combining" and "System and Method for Antenna Diversity Using Equal Gain Joint Maximal Ratio Combining," the entirety of both which are incorporated herein by reference. There are other techniques to improve the link margin for directed signal transmissions between two communication devices, including antenna selection diversity, for example.

Link margin improvement translates into a corresponding improvement in range, data rate at a given range, infrastructure cost to support a given data rate, and interference immunity. However, the range improvement afforded by CBF applies to signals that are sent in a point-to-point fashion from one device to another. Many wireless applications also require multicast signal communication, i.e., point to multipoint. Therefore, to improve the overall range related parameters of a wireless application, it is necessary to also improve the range of multicast signal transmissions. No such range improvement techniques for multicast communication are heretofore known.

SUMMARY OF THE INVENTION

Methods are provided to optimize range of multicast signal communication in wireless communication applications that use range-enhanced techniques for directed signal communication. An example of the techniques for range enhancement for directed signal communication is the composite beamforming techniques described above. A multicast signal may be sent multiple times through each of a plurality of independent omnidirectional transmit antennas of a communication device to a plurality of other communication devices to improve packet error rate (PER) at a given range (i.e., SNR). More generally, the multicast signal can be transmitted up to N times using any set of N complex linearly independent N-dimensional transmit weight vectors $v_1, \ldots, v_N$ associated with N plurality of transmit antennas that meets the power constraint $\|v_i\|^2=1$, $i=0, \ldots, N-1$, where the vector $v_i$ is used for the $i^{th}$ transmission of the multicast signal.

Other objects and advantages of the present invention will become more readily apparent when reference is made to the following description in conjunction with the accompanying drawings.

DETAILED DESCRIPTION OF THE DRAWINGS

Figure 1:
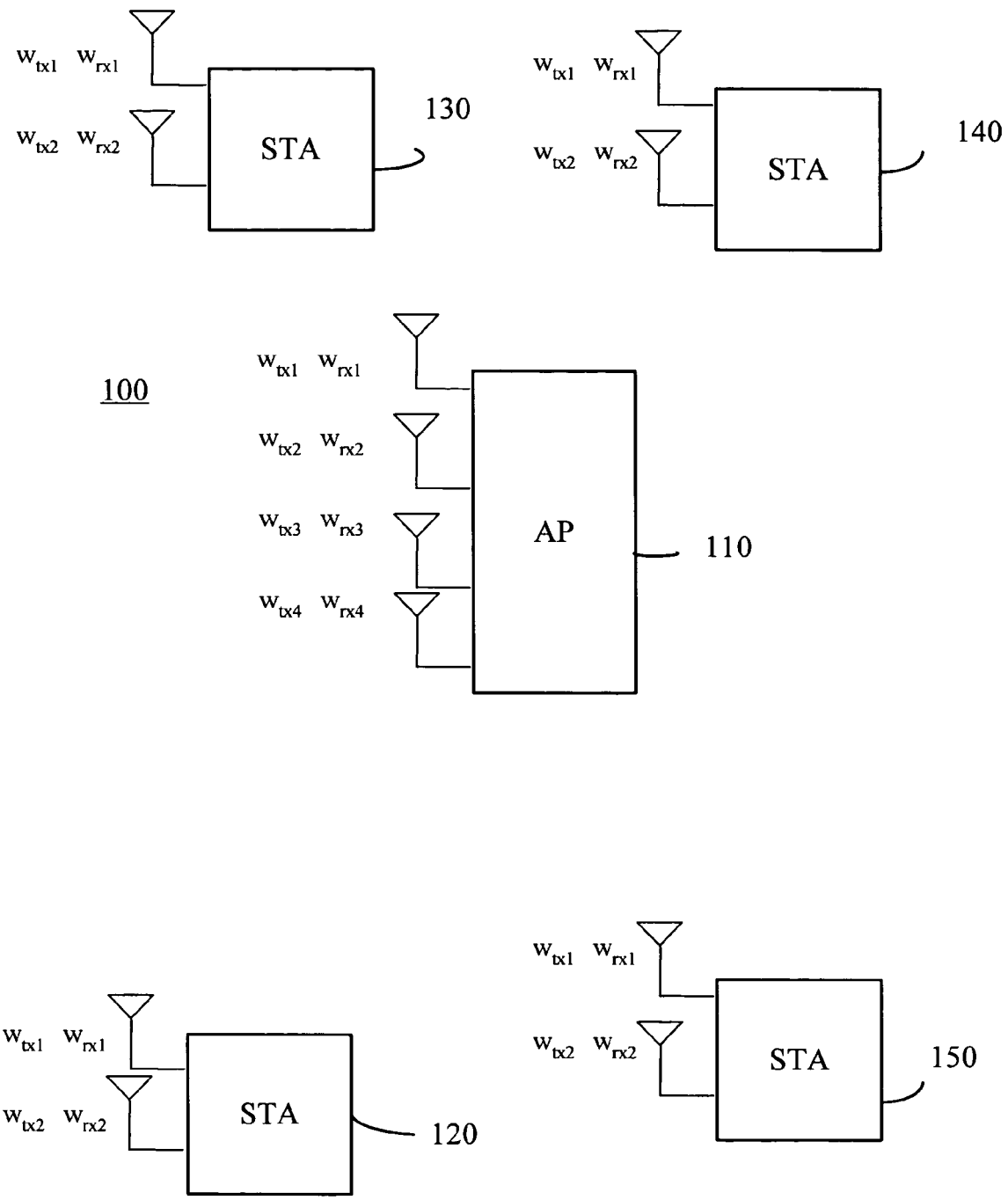
FIG. 1 is a block diagram of a wireless communication network comprising a plurality of communication terminals.

With reference first to FIG. 1, an example of a wireless application, such as a short-range wireless communication network 100 is shown. The wireless network is, for example, an IEEE 802.11x wireless local area network (WLAN), comprising an access point (AP) 110 and a plurality of stations (STAs) 120, 130, 140 and 150.

When two devices are in direct communication with each other, they use range-enhancement techniques, such as antenna selection diversity, composite beamforming, etc., for directed signal communication. For example, at least the AP 110, as well as some or all of the STAs have two or more antennas and are capable of performing composite beamforming. Specifically, a STA, such as STA 120, may have two antennas and when it transmits to another communication device in the network, such as the AP 110, it scales the transmit signal by complex transmit antenna weights $w_{tx1}$ and $w_{tx2}$ for the respective antennas. Similarly, when receiving a signal from the plurality of antennas of another device, such as the AP, it combines the signals received at its two antennas with complex receive antenna weights $w_{rx1}$ and $w_{rx2}$. The receive antenna weights are usually matched to the received signal at the antennas. The AP 110 has four antennas and therefore can perform 4x-beamforming when transmitting to another device and receiving from another device. Each device may determine and use optimum transmit antenna weights for a particular destination device through techniques described in the aforementioned co-pending application. In addition, each device may store this information for future use against an identifier for the corresponding destination device for use when transmitted to that device. The transmit antenna weights used by a device may are dependent on the particular destination device. Likewise, no two devices may use the same transmit antenna weights when transmitting to the same destination device. The transmit and receive antenna weights may be frequency dependent. When composite beamforming (CBF) is used between two communication devices that are in direct communication with each other, dramatic improvement in range is achieved as described in the aforementioned co-pending application. The communication devices may use other range enhancement techniques, such as antenna selection diversity, as opposed to CBF.

Again, the antenna processing techniques described above impact directed signal communication. In order to improve all around range performance, it is also necessary to improve the range for multicast signal communication. What follows are techniques to improve range for broadcast or multicast signal communication where CBF is used to extend range for point-to-point signal communication. The terms "unicast", "point-to-point" and "directed" are used synonymously and interchangeably herein. Likewise, the terms "broadcast" and "multicast" are used interchangeably.

In a wireless network, such as the one shown in FIG. 1, range is important in when the user density (i.e., the demand for bandwidth) is relatively low, infrastructure cost (i.e., access point (AP) density) is critical, or both. Examples of such environments are home, home office and lightly populated corporate or campus environments.

Capacity C of a WLAN is average throughput per unit area (in kbps per square meters. Some general rules of thumb for network planning are:

Enterprise Wired LAN: 1 user per 250 sq. ft, 100 kbps per user: C=4 kbps/m2

Enterprise WLAN (office environment): C=0.5-4 kbps/m2

Conference rooms, public areas: C=10 kbps/m2

Airports, lecture halls, hotel lobbies, etc.: C=10-20 kbps/m2

Range is generally not important for high-capacity applications (i.e., for C>~4 kbps/m$^2$). For these applications, data rate at range, becomes the important network design parameter.

In a wireless communication network application that operates in a coverage area (e.g., a cell), the "range" of a cell may be defined by a radius around a communication device that achieves a certain error rate. For example, the range of an IEEE 802.11x cell is the maximum cell radius satisfying both of the following conditions at a specified AP/STA transmit power level:

1. 10% PER at the lowest data rate (e.g., 6 Mbps for 802.11a) for unicast data with a 5% outage probability (due to fading); and 2. Multicast data and beacon messages can be received w/PER<=10% with a 5% outage probability.

For an 802.11a AP with 2-selection diversity in an indoor delay spread environment, the range is approximately 55 meters (Ptx=17 dBm). For 802.11b, the range is approximately 115 meters (Ptx=20 dBm).

A device, such as the AP 110, may have different range modes, including a range-enhanced mode. For example, a network administrator may program this mode at the AP whenever range is to be extended (at the expense of less system throughput) beyond that of a single (omnidirectional) transmit (Tx) antenna for multicast signals. The AP may be configured to operate in directed range-enhanced mode, such as CBF mode where a signal (packet, etc.) is transmitted through all four antennas simultaneously with corresponding transmit antenna weights. Alternatively, the AP may be configured to operate in the omnidirectional mode (omni-mode) where a packet is transmitted through one of four antennas at the same total output power as CBF mode.

When directed signals are transmitted, the devices at both ends of the link use a range enhancement technique, such as CBF. When multicast signals are transmitted, there are several other range enhancement techniques that can be summarized as follows. A multicast signal may be transmitted multiple times, each time through a different one of a plurality of independent omnidirectional transmit antennas of a communication device to a plurality of other communication devices to improve packet error rate (PER) at a given range (i.e., SNR). More generally, the multicast signal can be transmitted up to N times using any set of N complex linearly independent N-dimensional transmit weight vectors $v_1, \ldots, v_N$ associated with N plurality of transmit antennas that meets the power constraint $\|v_i\|^2=1$, i=0, ..., N-1, and the vector $v_i$ is used for the $i^{th}$ transmission of the multicast signal. For certain multicast signals that are transmitted repeatedly, such signals are transmitted in a round-robin fashion, cycling through the N antennas, ad infinitem for each scheduled transmission of the signal. To more broadly state this latter case, the $i^{th}$ transmission is sent using transmit weight vector $V_{mod(i,N)}$, for the $i_{th}$ transmission of the signal, where mod(m,n) denotes the remainder of m divided by n, where i is not bounded by N. By transmitting the multicast signal in this manner, the likelihood that all communication devices, at various locations with respect to the source communication, will receive the signal, is greatly enhanced.

When it is necessary to reserve the radio frequency medium for directed signals, the source communication device precedes the transmission of the directed signals by sending a sequence of multicast clear-to-send (CTS) frames (once through each omnidirectional antenna or more generally each CTS transmission using one of the complex linearly independent N dimensional transmit weight vectors described above). Each CTS includes information that informs the plurality of other communication devices of the impending data transmission, thereby reserving the medium before data transmission. When reserving the medium for certain types of data, such as isochronous data, the AP transmits basic network information together with a delivery traffic indication map after the 4 CTS frames are sent. Any of these schemes can be further enhanced by transmitting the multicast signal with transmit delay diversity.

Figure 2:
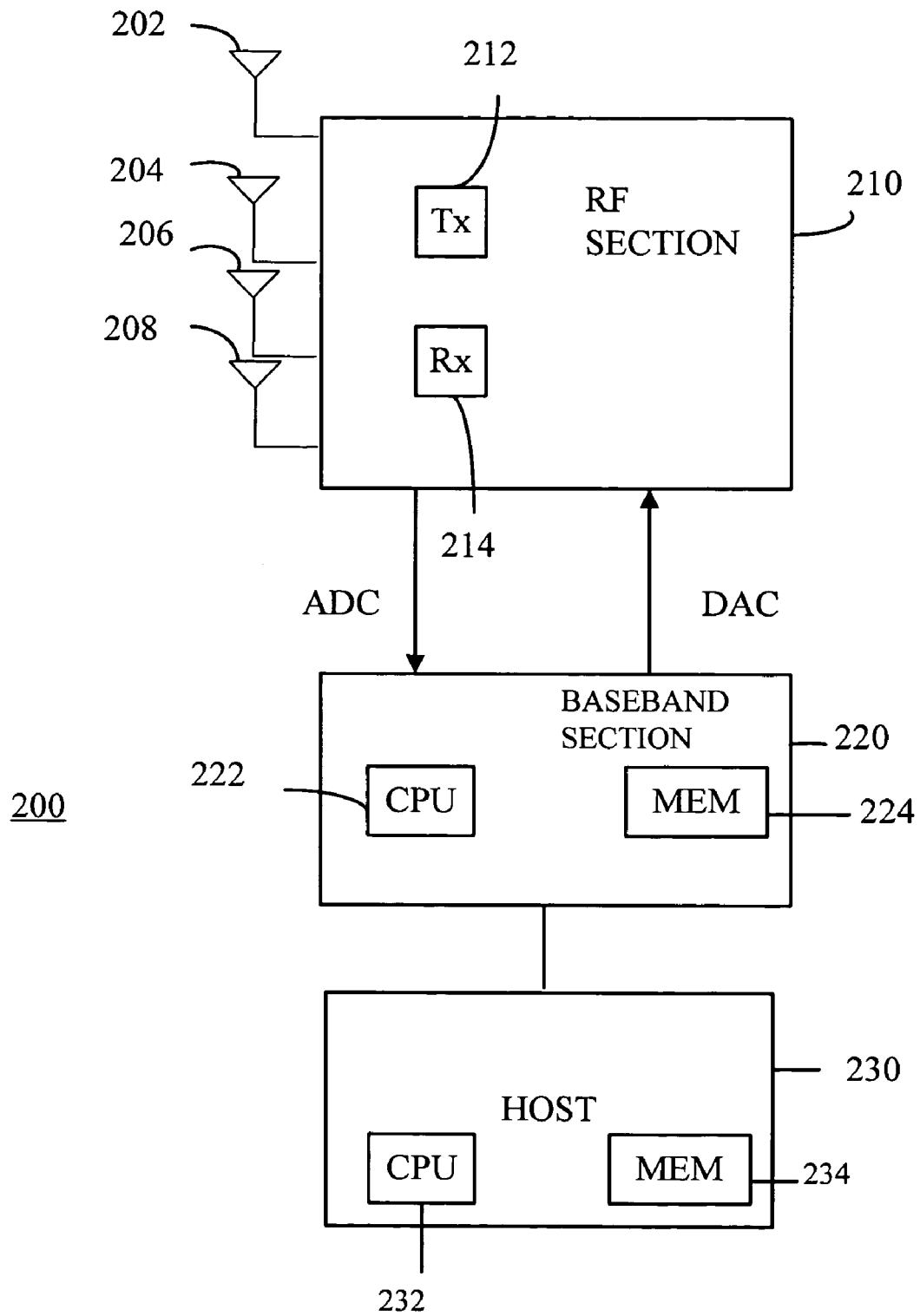
FIG. 2 a block diagram of an exemplary communication device suitable for use in the processes described herein.

FIG. 2 illustrates a block diagram of a STA or AP 200 that can be used for any one of the terminals shown in FIG. 1. The terminal in FIG. 3 comprises at least two antennas, though four antennas 202, 204, 206 and 208 are shown such as would be the case for the AP. An RF section 210 is coupled to the antennas 202-208, and includes a transmitter (Tx) 212 and a receiver (Rx) 214. A baseband section 220 is coupled to the RF section 210. The baseband section 220 may include a CPU or processor 222 and memory 224. The processor 222 performs the processing steps in the communication device that are described hereinafter. The memory 224 stores the channel transfer function information (e.g., transmit antenna weights) associated with a particular destination device that is retrievable by the processor 222. For example, the memory 224 is random access memory (RAM). The CPU 222 executes instructions that are stored or encoded on a processor readable medium that when cause the CPU to perform the processes described above in conjunction with FIG. 2. Alternatively, the baseband section may be implemented by a digital application specific integrated circuit (ASIC) with a synthesized processor core and/or may include dedicated processor functionality such as field programmable gates that implement digital signal processor instructions to perform the processes described herein. The baseband section 220 is coupled to a host processor 230. Still another alternative is for the processing steps to be performed by a host processor 232 (in a host 230) by executing instructions stored in (or encoded on) a processor readable memory 234. The RF section 210 may be embodied by one integrated circuit, and the baseband section 220 may be embodied by another integrated circuit. The communication device on each end of the communication link need not have the same device architecture or implementation.

The baseband section 220, either by way of the processor 222, or through other dedicated functionality (such as field programmable gates) multiplies the signal to be transmitted by corresponding transmit antenna weights and likewise multiplies signals received at each of the antennas by corresponding receive antenna weights and combines the resulting signals to recover the received signal therefrom. When it is stated hereinafter that a communication device transmits a signal to another communication using "CBF", this means that the transmitting communication device multiplies the signal by transmit antenna weights (corresponding to the plurality of antennas of the transmitting communication device) corresponding to a destination device, that optimize reception of the signal at the destination device. The transmit and receive antenna weights have real and imaginary components (magnitude and phase) that may vary with frequency to account for the frequency response of the communication medium between transmit and receive communication devices, as described in the aforementioned co-pending applications. When transmitting a signal through a single antenna antenna, the baseband section 220 multiplies the signal with a transmit weight vector that weights one antenna and nulls all of the other antennas. For example, to select antenna 202 (out of four antennas), the transmit weight vector is (1 0 0 0), to select antenna 204, the transmit weight vector is (0 1 0 0), etc. More generally, the processor in the baseband section 220 processes the multicast signal using any set of N complex linearly independent N-dimensional transmit weight vectors $v_1, \ldots, v_N$ associated with N plurality of transmit antennas that meets the power constraint $\|v_i\|^2=1$, i=0, ..., N−1, where the vector $v_i$ is used for the $i^{th}$ transmission of the multicast signal. For example, for N=4, one transmission of the multicast signal is sent with the transmit weight vector (1 0 1 0) and the next transmission it is sent with the transmit weight vector (0 1 0 1), and so on.

The transmitter 312 upconverts signals to be transmitted by the antennas 302-308 and the receiver 314 downconverts signals received by the antennas. In the case where the terminal has just two antennas to perform antenna selection diversity, there is a switch in the RF section that selects one of the two antennas for reception of transmission of signals.

Figure 3:
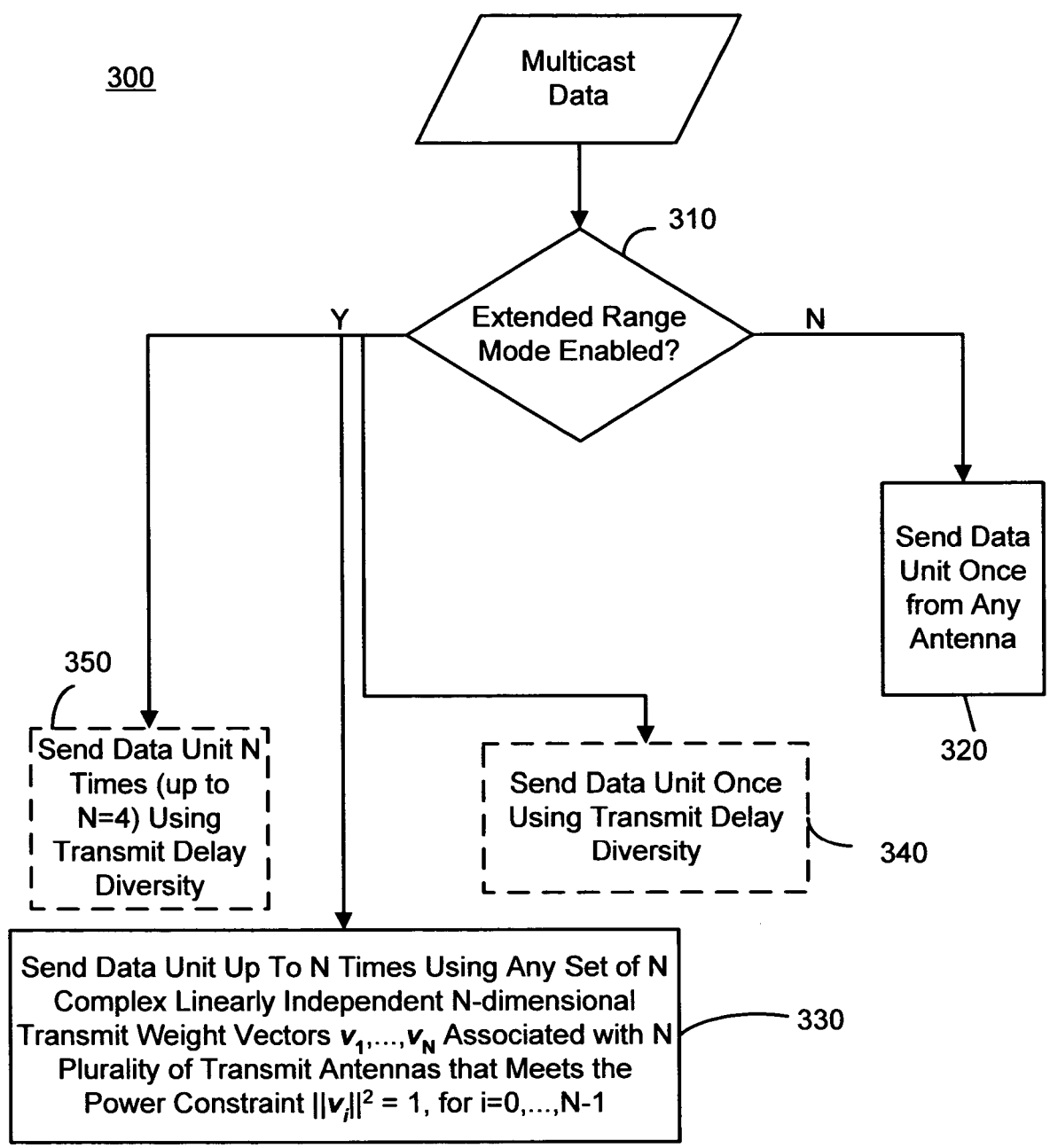
FIG. 3 is a flow chart illustrating a procedure for transmitting multicast signals in a wireless communication network.

FIG. 3 shows a process 300 for transmitting a multicast data signal from an AP to multiple (or all) STAs. For example, the data unit is a media service data unit (MSDU) or a MAC protocol data unit (MPDU) according to IEEE 802.11x WLAN protocol. In step 310, the AP determines whether the extended mode of operation is enabled or disabled. If the extended mode is disabled, then in step 320, the AP transmits the data unit once from of its plurality of antennas. If it is determined in step 310 that the extended mode is enabled, then in step 330, the AP transmits the data unit up to a total of N times, once through each of its plurality of antennas, or more generally, the AP may send the data unit up to N times using any set of N complex linearly independent N-dimensional transmit weight vectors $v_1, \ldots, v_N$ associated with N plurality of transmit antennas that meets the power constraint $\|v_i\|^2=1$, i=0, ..., N−1, where the vector $v_i$ is used for the $i^{th}$ transmission of the multicast signal. This approach gives significant improvement in PER (at the expense of lower throughput) due to antenna diversity and repeated transmission by increasing the likelihood that the data unit will be received by each STA. When implementing this approach, the AP uses the Sequence Number and Retry subfields in the MAC header to ensure proper duplicate filtering in the STAs.

TABLE 1

| | 0 ns RMS Delay Spread | | | 50 ns RMS Delay Spread | | | 150 ns RMS Delay Spread | | |
|---|---|---|---|---|---|---|---|---|---|
| N = # Repetitions | 2-WBS STAs | 2-CBF STAs | 4-CBF STAs | 2-WBS STAs | 2-CBF STAs | 4-CBF STAs | 2-WBS STAs | 2-CBF STAs | 4-CBF STAs |
| 1 | 0 | 2 | 9 | 0.5 | 4 | 9 | 1 | 5.5 | 10 |
| 2 | 8.5 | 9.5 | 13 | 7.5 | 9 | 14 | 6 | 9 | 14 |
| 4 | 10.5 | 11.5 | 14 | 8.5 | 11 | 14 | 8 | 10 | 14 |

The table above shows, through simulations, sensitivity improvement in dB at 10% PER for 802.11a at 24 Mbps relative to the 2-WBS, delay spread=0 ns, N=1 case. "WBS" means STAs using 2-antenna wideband selection diversity as opposed to CBF-enhanced STAs.

FIG. 3 also shows other alternatives to step 330. For example, in step 340, to improve range, the AP may send the data unit once using transmit delay diversity. This means essentially that a delay is introduced between the transmissions of the data unit among the plurality of AP antennas according to a transmit vector $x(t)=[x_0(t), x_1(t-\tau_D), \ldots, x_{Nt-1}(t-(Nt-1))\tau_D]$, where N is the number of AP antennas used for transmission and $\tau_D$ is a transmit delay parameter. In essence, the signal will be sent from each antenna with a different delay spread and such that the maximum delay spread between any two antennas is (N−1) $\tau_D$. It has been found through performance simulations that a transmit delay parameter $\tau_D$ of 1000 ns provides optimal delay spread, but can be programmable to span 50 ns to 150 ns, for example.

Still another alternative shown in step 350 is to transmit the data unit a total of N times (up to the number of antennas), each time using transmit delay diversity (as described above).

Figure 4:
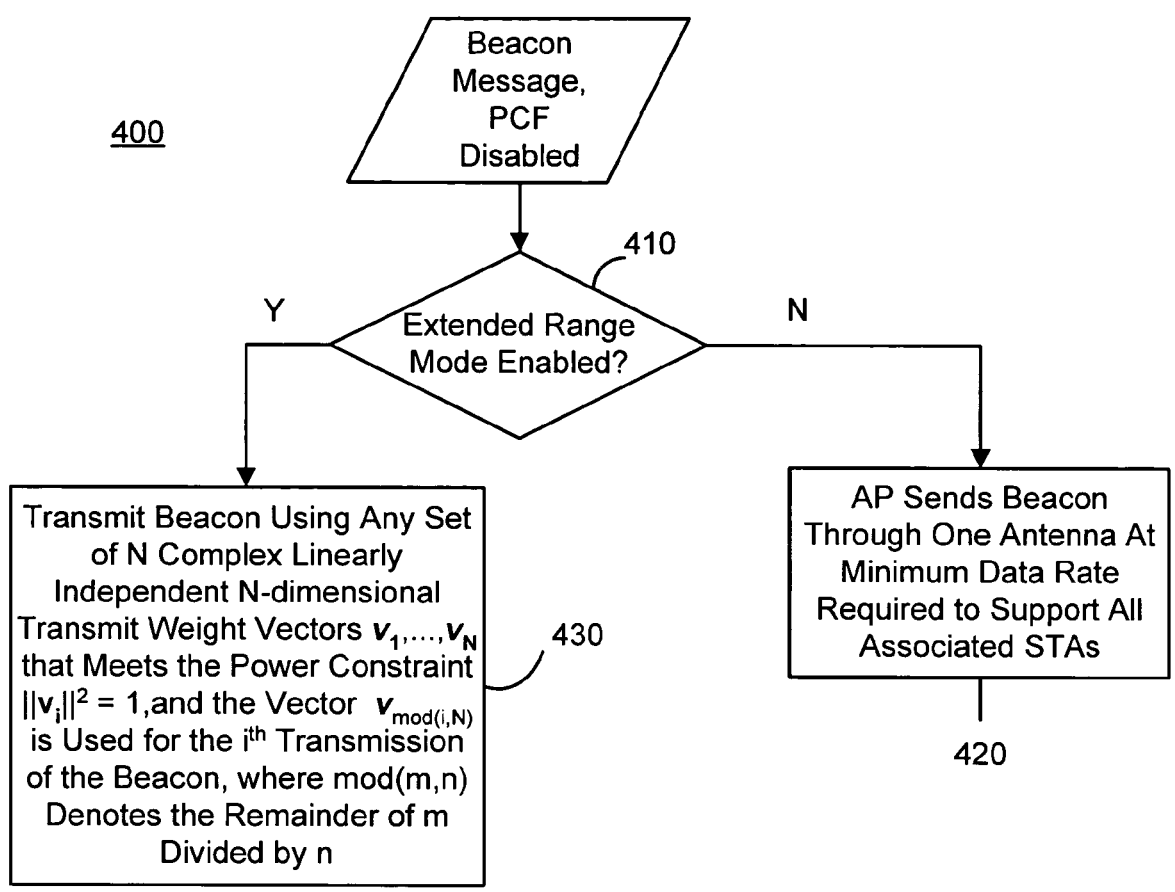
FIG. 4 is a flow chart illustrating a procedure for transmitting a beacon type message.

FIG. 4 shows a process 400 for transmitting another type of multicast signal that is used to inform all communication devices (e.g. STAs) about subsequent signals scheduled for transmission on the radio frequency medium. As an example, this multicast signal is a Beacon frame that is sent when the point coordination function (PCF) is disabled. PCF is an IEEE 802.11x function that is a centrally controlled access mechanism that uses a poll and response protocol to eliminate the possibility of contention for the medium. The PCF will be described further below. According to the IEEE 802.11x WLAN protocol, the Beacon frame is transmitted periodically to allow mobile stations to locate and identify a basic service set (BSS) in time and physical parameters at any time in the future. The Beacon frame also conveys information to stations about frames that may be buffered during times of low power operation. Elements of a Beacon frame include the service set identity (SSID), the supported rates of the BSS, one or more PHY parameter sets, an optional contention-free parameter set, an optional IBSS parameter set and an optional traffic indication map.

If the extended range mode is disabled (step 410), then in step 420, the AP transmits a Beacon frame through one antenna at the minimum data rate required to support all associated STAs. If the extended range mode is enabled, then in step 430, the AP transmits the Beacon frame sequentially through each antenna, moving to the next AP antennas each time the Beacon frame is scheduled to be transmitted, in a round-robin fashion at a minimum data rate required to support all STAs, ad infinitum for Beacon transmissions. The same power save (PS) list is used for all Beacons. This process provides significant performance enhancement relative to the single antenna case, since each STA sees multiple repetitions of the Beacon with independent fading for up to four repetitions.

Again, more generally, the Beacon can be transmitted using the transmit weight vector $v_{mod(i,N)}$, for the $i^{th}$ transmission of the Beacon, where mod(m,n) denotes the remainder of m divided by n. In this case, the number of transmissions i is not bounded by N−1. This is useful for sending Beacon frames on an ongoing, repetitive basis.

Data from Table 1 can be used to quantify performance. For an indoor environment w/50 ns delay spread, for example, a STA can reliably decode a beacon after 2 repetitions using 7.5 dB less Rx power, and after 4 repetitions using 8.5 dB less power.

Like the multicast data unit process of FIG. 3, the Beacon frame can alternatively be transmitted once through using transmit delay diversity, or N times, each time using transmit delay diversity.

Figure 5:
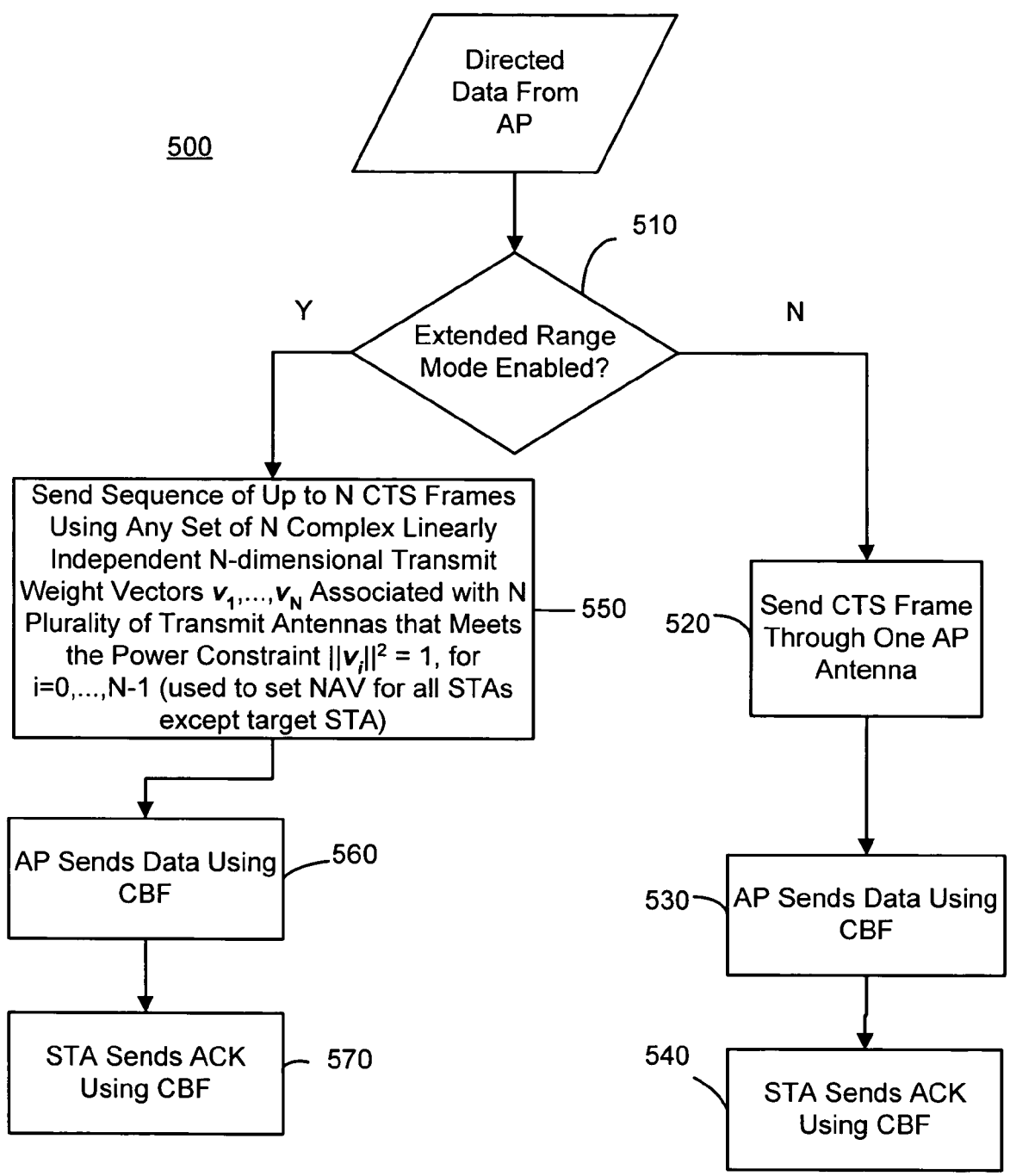
FIG. 5 is a flow chart illustrating a procedure for transmitting directed data from an access point.

FIG. 5 shows a process 500 for transmitting directed data from a source communication device (the AP) to a destination communication device (a particular STA). The data may be, for example, a directed MSDU or MPDU. In order to transmit the directed data, the source communication device reserves the communication medium by alerting all of the other communication devices (with a multicast signal) of the impending data transmission. In step 510, the AP determines whether the extended range mode is enabled. When it is not enabled, the frame sequence is {CTS-}{frag-ACK-}last-ACK. Specifically, in step 520, the AP sends a clear-to-send (CTS) frame through one AP antennas to announce to all STAs in the neighborhood of both the AP and the destination STA of the impending transmission from the AP to the destination STA. The CTS is optional and only necessary if system simulations show that other STAs have difficulty receiving directed data units sent in CBF mode. Next, in step 530, the AP transmits the data unit to the destination STA using CBF. In step 540, if and when the STA receives the data unit, it transmits an acknowledgment frame (ACK) to the AP using CBF.

If in step 510, the AP determines that the extended range mode is enabled, then the sequence is {CTSxN-}{frag-ACK-}last-ACK. Specifically, in step 550, CTSxN is a sequence of up to N CTS frames (N equals the number of AP antennas) each CTS frame sent through a different AP antenna and used to set the network allocation vector (NAV) for STAs other than the destination STA. More generally, the CTS frame is sent up to N times any set of N complex linearly independent N-dimensional transmit weight vectors $v_1, \ldots, v_N$ associated with N plurality of transmit antennas that meets the power constraint $\|v_i\|^2=1$, $i=0, \ldots, N-1$, where the vector $v_i$ is used for the $i^{th}$ transmission of the multicast signal. The NAV is an 802.11x frame that informs STAs of the amount of time before the medium will become available. In step 560, the AP transmits the data unit to the destination STA using CBF, and in step 570, when the STA receives the data unit, it transmits an ACK to the AP using CBF.

Like the process of FIG. 3, the CTS frame can alternatively be transmitted once through an antenna using transmit delay diversity, or N times, each time using transmit delay diversity.

Figure 6:
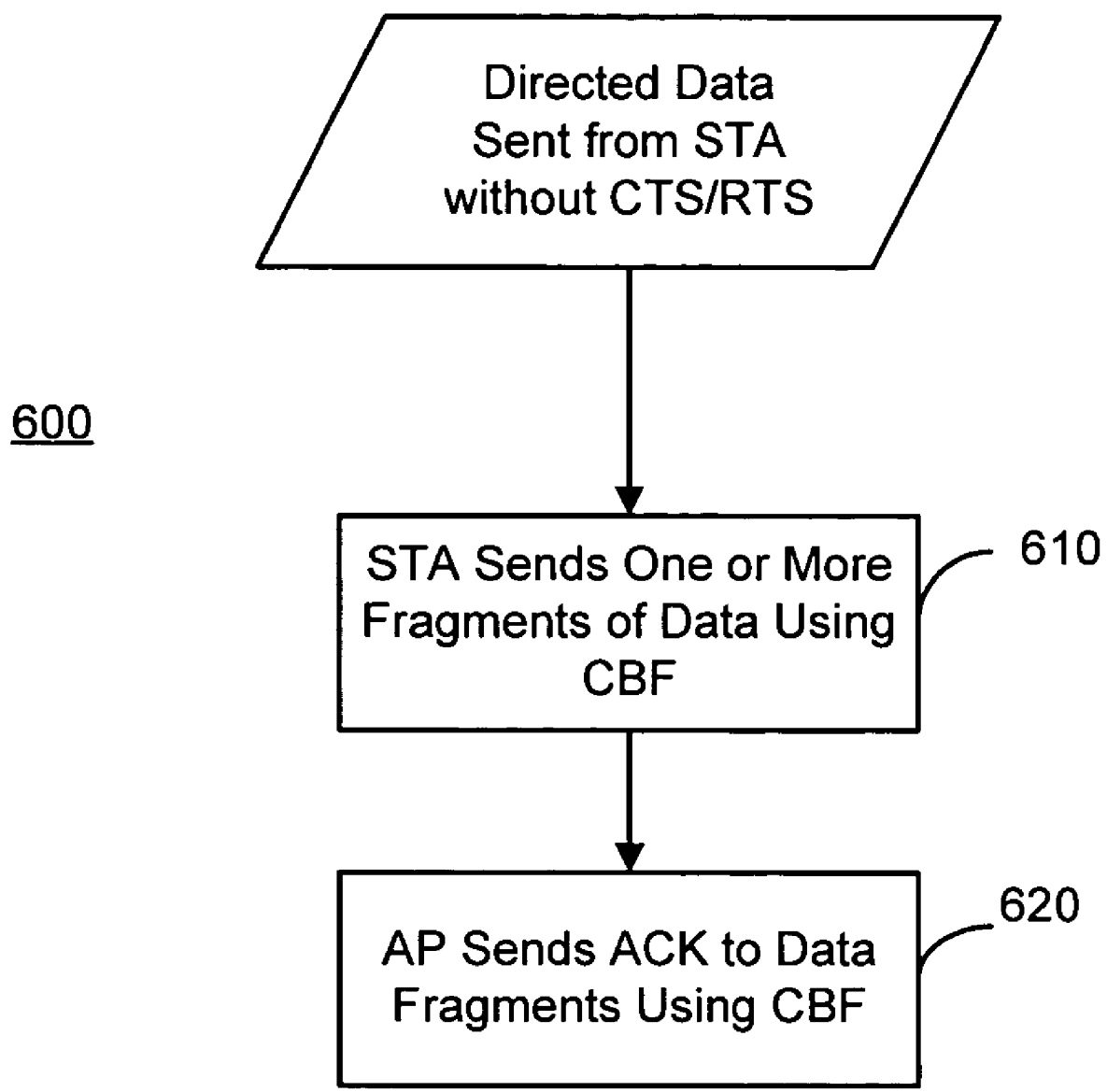
FIG. 6 is a flow chart illustrating a procedure for transmitting directed data from a station not using a clear-to-send/request-to-send process.

FIG. 6 shows a process 600 useful when a STA sends a directed data unit (MSDU or MPDU) without the request-to-send (RTS)/CTS scheme. The RTS frame is a signal directed to the AP that requests the AP to reserve the medium for transmission of data from the STA to the AP. The sequence {frag-ACK-}last-ACK is useful regardless of whether the extended range mode is enabled or disabled. In step 610, the STA transmits one or more data fragments to the AP using CBF. In step 620, if and when the AP receives the data fragments, it transmits an ACK to the STA using CBF.

Figure 7:
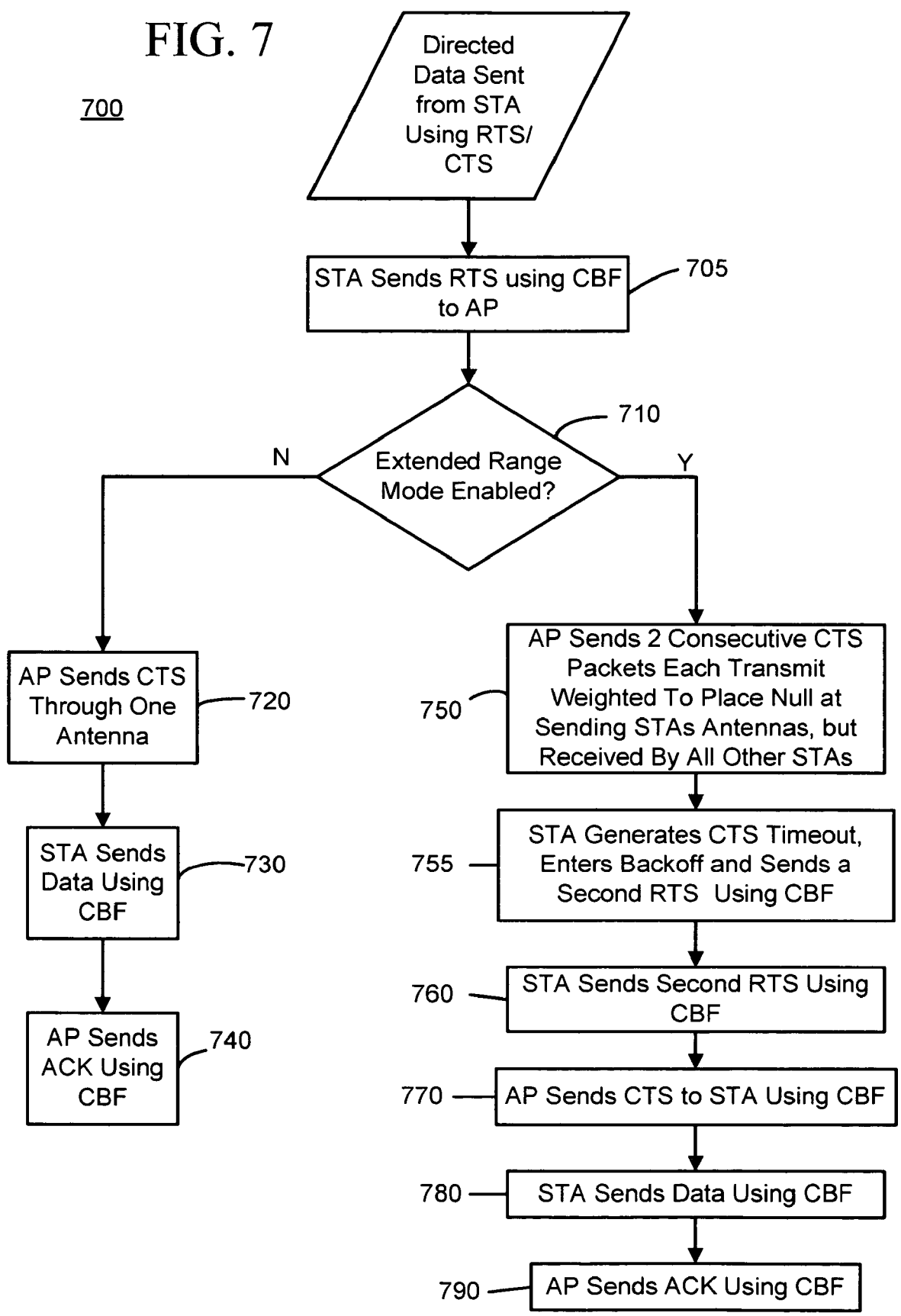
FIG. 7 is a flow chart illustrating a procedure for transmitting directed data from a station using a clear-to-send/request-to-send process.

FIG. 7 illustrates a process 700 useful when a STA transmits a directed data unit using the RTS/CTS scheme. In step 705, the STA sends an RTS frame to the AP using a directed range-enhancement technique, such as CBF, and upon receiving the RTS frame the AP determines whether the extended range mode is enabled. If the extended range mode is not enabled when the AP receives the RTS, then the sequence is CTS-{frag-ACK-}last-ACK. Specifically, in step 720, in response to receiving the RTS, the AP transmits a CTS frame through one AP antenna. In response to receiving the CTS, in step 730, the STA transmits the data unit using CBF. In step 740, when the AP receives the data unit, it transmits an ACK using CBF.

When the AP receives the RTS and determines that the extended range mode is enabled, the sequence is: CTS*-timeout-backoff-RTS-CTS-{frag-ACK-}last-ACK. Specifically, in step 750, in response to receiving the RTS, the AP transmits a sequence of first and second consecutive CTS frames addressed to the AP each time using a transmit weight vector that is in the null space of H, where H represents the channel response matrix between the AP and the sending STA, such that when the CTS frames are transmitted by the AP antennas, a null is placed at the sending STA's antennas. Furthermore, in addition to being in the null space of H, the transmit weight vectors for the two CTS frames may be linearly independent transmit weight vectors in order to improve performance by generating independent fading for each CTS. Such can be the case if the AP has four antennas and the STAs have two antennas, so that there are at least two linearly independent vectors in the null space of H. The AP can determine the channel response matrix H when it receives a signal, such as an RTS frame, from the STA, as described in the aforementioned co-pending applications incorporated herein by reference, and from that information determine the transmit weight vector that satisfies this condition.

This sequence is referred to as CTS* and it ensures that all STAs except the sending STA receive at least one of the CTS frames and stay off the medium during the data transmission. Since the sending STA does not receive either CTS* frame (due to the null), in step 755, the sending STA will generate a CTS timeout, execute a back-off, and in step 760 send a second RTS packet (using CBF if it is CBF-capable). In step 770, the AP responds to the second RTS by transmitting a CTS frame (using CBF) addressed to the sending STA. In step 780, the STA responds to the CTS and transmits a data fragment burst using CBF. In step 790, when the AP receives the data fragments, it transmits an ACK using CBF. The network allocation vector (NAV) in the CTS* sequence is long enough to complete this transaction in the worst case.

Figure 8:
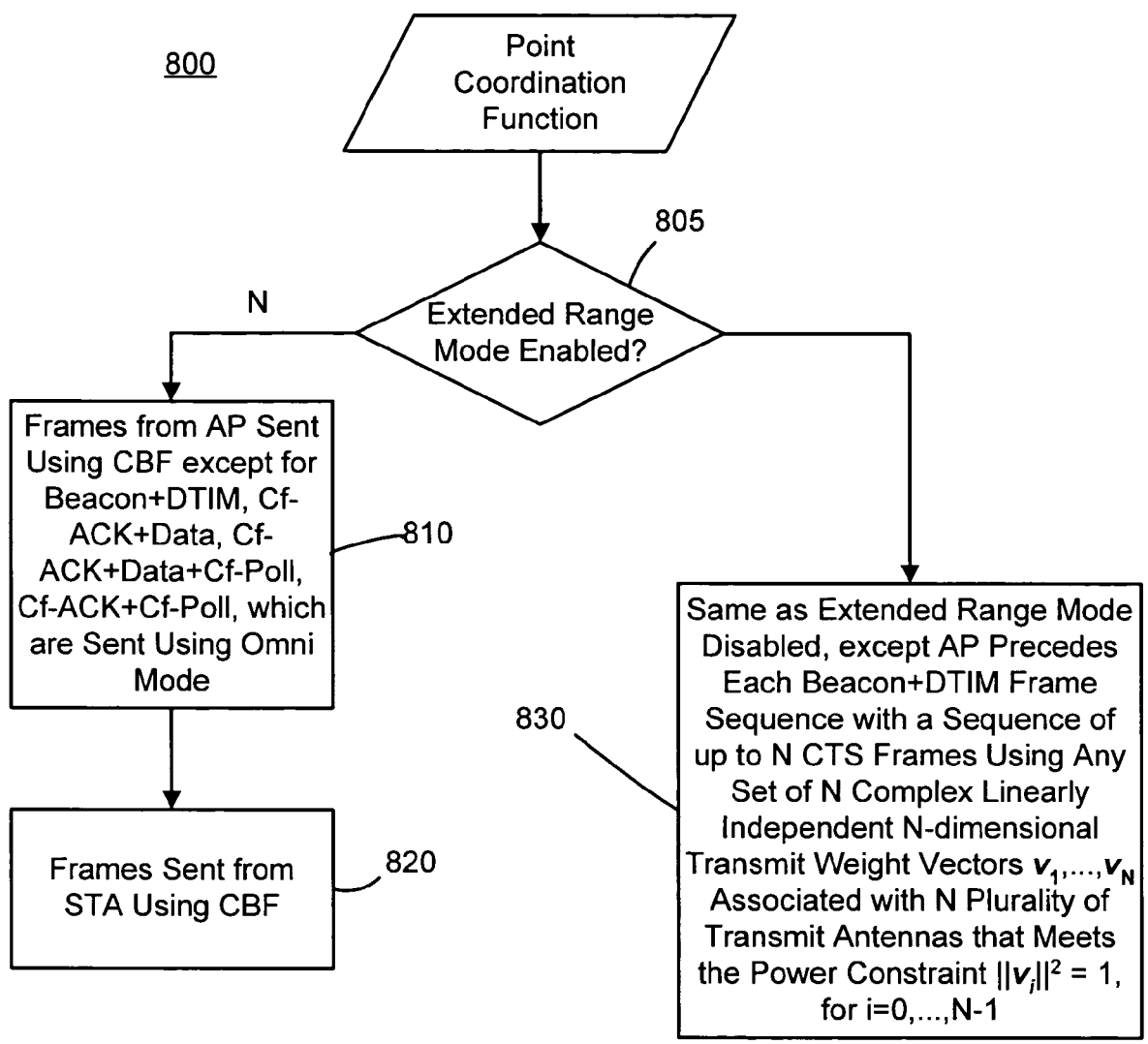
FIG. 8 is a flow chart illustrating a procedure for communication when a point coordination function is enabled in the network.

FIG. 8 shows a process 900 useful for the PCF operation. In the PCF operation, a point coordinator (PC) located in an AP receives requests from STAs to register them on a polling list, and the PC then regularly polls the STAs for traffic while also delivering traffic to the STAs. The PCF is able to deliver near-isochronous service to the STAs on the polling list. The PCF is built over the distributed coordination function (DCF) and both operate simultaneously. When the extended range mode is disabled (step 805), in step 810 the AP transmits frames as follows.

Beacon+DTIM: Omni mode
Cf-poll: CBF mode
Cf-ACK: CBF mode
Data: CBF mode
ACK: CBF mode
Cf-ACK+data, Cf-ACK+Data+Cf-Poll, Cf-ACK+Cf-Poll: Omni mode The STA transmits frames in step 820 as follows.

Cf-ACK: CBF mode
Data: CBF mode
Data+Cf-ACK: CBF mode
ACK: CBF mode
Null: CBF mode In step 830, operation when the extended range mode is enabled is the same as when the extended range mode is disabled, except that the AP precedes each Beacon+DTIM (delivery traffic indication map) with a sequence of up to 4 CTS frames each sent through a different AP antenna, or each sent with up to N times using any set of N complex linearly independent N-dimensional transmit weight vectors $v_1, \ldots, v_N$ associated with N plurality of transmit antennas that meets the power constraint $\|v_i\|^2=1$, i=0, ..., N−1, where the vector $v_i$ is used for the $i^{th}$ transmission of the multicast signal. The CTS frames reserve the medium prior to the contention free period (CFP) for the entire duration of the CFP, and the repetition of these packets improves the likelihood that at least one CTS is received by all STAs in extended range mode. The Beacon frame is sent in this case through one antenna. The 4 CTS frames will reserve the medium for the duration of the contention free period (CFP) even if the beacon is not received by some STAs. The PCF operation is useful for communication of isochronous data, such as voice or video.

Like the process of FIG. 3, the CTS frame of step 830 can alternatively be transmitted once using transmit delay diversity, or N times, each time using transmit delay diversity.

Other frames of interest are STA initiated sequences including the PS-Poll sequence and the announcement traffic indication map (ATIM) frame. In the PS-Poll scheme, a PS-Poll is sent from the STA using CBF and the AP sends an ACK using CBF. For the ATIM frame, the ATIM is sent from an otherwise CBF-capable STA using a single antenna. Alternatively, a STA can send a directed ATIM in CBF mode.

TABLE 2

| Case | Typical 2-WBS NIC + AP | 2-WBS NIC, 4-CBF AP | 2-CBF NIC, 4-CBF AP | 4-CBF NIC, 4-CBF AP |
|---|---|---|---|---|
| Directed Data - AP to STA (dB) | 0 | 11 | 14 | 16.5 |
| Directed Data - STA to AP (dB) | 0 | 11 | 14 | 16.5 |
| Multicast Messages (dB) | 0 | 8 | 10 | 14 |
| Beacons (dB) | 0 | 8 | 10 | 14 |
| Minimum of Above (dB) | 0 | 8 | 10 | 14 |
| Range Improvement (%) | 0% | 75% | 101% | 166% |
| Coverage Area Improvement (%) | 0% | 205% | 304% | 605% |
| Reduction in AP density (%) | 0% | 67% | 75% | 86% |

Table 2 shows the range improvement for CBF-enhanced 802.11a relative to a "typical" NIC+AP case, using the enhancements described above (typical means 2-antenna wideband selection diversity on both NIC and AP). The first four rows show link margin improvement (in dB) for directed data, multicast data and Beacons and the information for multicast data and beacons is taken from Table 1, where it is assumed both multicast messages are repeated 4 times through each Tx antenna, and Beacons are sent round-robin through each antenna. Range improvements are computed as 10 lmi/33, where lmi represents the minimum link margin improvement over rows 1-4 in the table, and 33 represents the path loss coefficient for the indoor wireless channel.

To summarize, the range improvements over the typical AP+NIC case are:

75% percent range improvement (8 dB) for 4×-CBF AP and typical NICs;

100% percent range improvement (10 dB) for 4×-CBF AP and 2×-CBF NICs; and

166% percent range improvement (14 dB) for 4×-CBF AP and 4×-CBF NICs.

Figure 9:
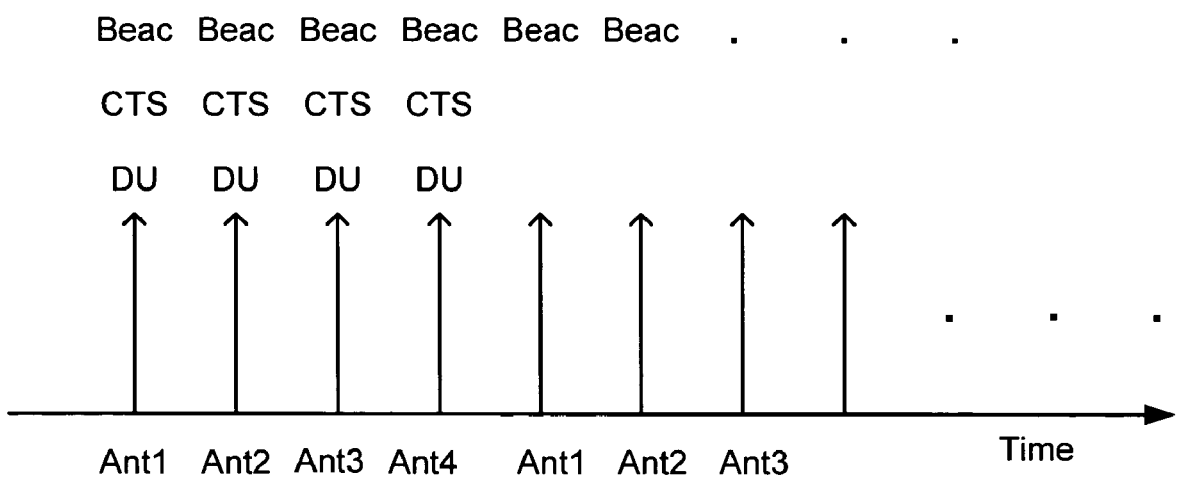
FIG. 9 is a timing diagram showing the repetitive transmission of certain multicast signals.

FIG. 9 illustrates a timing diagram to depict the timing of transmission of the multicast signals of FIGS. 3-5 and 8. FIG. 9 shows that an AP having four antennas that, as one example, transmits the multicast data unit (DU) once from each antenna Ant1 through Ant4 sequentially in time. Similarly, the AP transmits a CTS frame once from each antenna Ant1 through Ant4. The AP transmits the Beacon frame once from each antenna Ant1 through Ant4 in a round-robin fashion for each scheduled Beacon frame. These are simplified examples of the more general case where the transmit antenna weight vectors can be any set of N complex linearly independent N-dimensional transmit weight vectors $v_1, \ldots, v_N$ associated with N plurality of transmit antennas that meets the power constraint $\|v_i\|^2=1$.

To summarize, techniques are provided to enhance the range of multicast signals by transmitting the signal up to N times any set of N complex linearly independent N-dimensional transmit weight vectors $v_1, \ldots, v_N$ associated with N plurality of transmit antennas that meets the power constraint $\|v_i\|^2=1$, i=0, ..., N−1, where the vector $v_1$ is used for the $i^{th}$ transmission of the signal. Other related methods are provided to enhance the range of multicast signals, such as the method of responding to a RTS signal from a communication device and sending at least one CTS signal using a transmit weight vector that is in the null space of the channel response matrix between the two communication devices. These methods may be implemented by instructions encoded on a medium, such as processor readable medium, or field programmable gates on an integrated circuit.

The above description is intended by way of example only.

What is claimed is:

1. A method for enabling wireless communication comprising:
   receiving at a first communication device a first request-to-send (RTS) signal transmitted by a second communication device, wherein the first RTS signal requests reservation of a radio communication medium for transmission of a signal from the second communication device to the first communication device;
   at the first communication device, generating a first clear-to-send (CTS) signal including information to inform communication devices of an impending transmission on the radio communication medium;
   transmitting the first CTS signal from the first communication device with antenna processing parameters so as to cause a null at the second communication device but not at a plurality of other communication devices;
   generating a CTS timeout, executing a back-off and sending a second RTS signal using composite beamforming (CBF);
   receiving a second RTS signal transmitted by the second communication device using CBF after a CTS timeout;
   transmitting a second CTS signal to the second communication device in response to the second RTS using CBF;
   receiving data fragments transmitted by the second communication device using CBF; and
   transmitting an acknowledgement (ACK) to the second communication device using CBF.

2. The method of claim 1, wherein the transmitting the first CTS signal comprises using a transmit weight vector that is in the null space of H, where H represents the channel response matrix between the first communication device and the second communication device.

3. The method of claim 1, wherein the generating a first clear-to-send (CTS) signal comprises generating at least first and second CTS packets, each of which is addressed to the first communication device, and is transmitted using a transmit weight vector that is in the null space of H.

4. The method of claim 1, wherein the transmitting comprises transmitting the first and second CTS packets with transmit weight vectors that are linearly independent.

5. The method of claim 1, wherein the transmitting the first CTS signal comprises processing the first CTS signal with transmit antenna weights associated with the plurality of antennas of the first communication device that optimize reception of the first CTS signal by the second communication device.

6. The method of claim 1, further comprising transmitting the acknowledgment (ACK) signal from the first communication device to the second communication device via the plurality of antennas using transmit antenna weights associated with the plurality of antennas of the first communication device that optimize reception of the CTS signal by the second communication device.

7. A processor readable medium encoded with instructions, that when executed by a processor, perform functions [that include] comprising:
   in response to a first request-to-send (RTS) signal transmitted by a second communication device and received by a first communication device, generating a first clear-to-send (CTS) signal including information to inform communication devices of an impending transmission on the radio communication medium;
   processing the first CTS signal with antenna processing parameters so as to cause a null at the second communication device but not at a plurality of other communication devices using a transmit weight vector that is in the null space of H, where H represents the channel response matrix between the first communication device and the second communication device;
   receiving a second RTS signal transmitted by the second communication device using composite beamforming (CBF) after a CTS timeout;
   transmitting a second CTS signal to the second communication device in response to the second RTS using CBF;
   receiving data fragments transmitted by the second communication device using CBF; and
   transmitting an acknowledgement (ACK) to the second communication device using CBF.

8. The medium of claim 7, and further encoded with instructions that generate at least first and second CTS signals and process the first and second CTS signals with transmit weight vectors that are linearly independent.

9. The medium of claim 7, and further encoded with instructions to process the first CTS signal addressed to the second communication device with transmit antenna weights associated with the plurality of antennas of the first communication device that optimize reception of the first CTS signal by the second communication device.

10. The medium of claim 9, and further encoded with instructions that, process the ACK signal with transmit antenna weights associated with the plurality of antennas of the first communication device that optimize reception of the first CTS signal by the second communication device.

11. A communication device comprising the medium of claim 7, and further comprising:
   a receiver that downconverts signals received by the plurality of antennas;
   a transmitter that upconverts signals to be transmitted; and
   a processor coupled to the transmitter and the receiver that processes instructions encoded on the medium.

12. An integrated circuit comprising the medium of claim 7.

* * * * *

UNITED STATES PATENT AND TRADEMARK OFFICE
CERTIFICATE OF CORRECTION

PATENT NO. : 7,570,921 B2
APPLICATION NO. : 10/855279
DATED : August 4, 2009
INVENTOR(S) : Sugar et al.

It is certified that error appears in the above-identified patent and that said Letters Patent is hereby corrected as shown below:

ON THE TITLE PAGE

Item (56), U.S. PATENT DOCUMENTS, page 2, right column, at line beginning with "2001/0053699" after "12/2001" delete "McGrady et al. ... 455/513" and insert therefor --McCrady et al. ... 455/513--.

Item (56), OTHER PUBLICATIONS, page 3, left column, on the line beginning with "Mobile Conference" after the words "Mar. 1999," delete "pp. 334-339" and insert therefor --pp. 375-380--.

Item (56), OTHER PUBLICATIONS, page 4, left column, lines 34 & 35, after the words "On Channel" delete "of Correlated MIMO Channels", ITG Fokusprojekt: Mobilommunikation" and insert therefor --Capacity of Correlated MIMO Channels", ITG Fokusprojekt: Mobilkommunikation--.

Item (56), OTHER PUBLICATIONS, page 4, right column, line 20, on the line beginning with "Vaidayanathan" delete the word "Vaidayanathan" and insert therefor --Vaidyanathan--.

Item (56), OTHER PUBLICATIONS, page 6, right column, line 35, on the line beginning with "Wennstrom et al.," delete "Wennstrom et al." and insert therefor --Wennström et al.--.

Item (57), ABSTRACT, page 1, right column, line 9, after the first use of the words "times using" delete "up to N times using".

IN THE SPECIFICATION

At column 2, line 13, before the words "a block" insert --is--.

At column 2, line 67, after the word "may" delete "are" and insert therefor --be--.

At column 3, line 22, after the word "important" delete "in".

At column 4, line 61, after the words "medium that" delete "when".

At column 5, line 42, after the word "single" delete first instance of the word "antenna".

At column 6, line 4, after the words "once from" delete "of".

At column 6, line 44, before the words "where N" delete "$x_{Nt}\text{-}1(t\text{--}(Nt\text{--}1))\tau_D],$" and insert therefor --$x_{Nt-1}(t\text{--}(Nt\text{--}1))\,\tau_D],$--.

At column 7, line 48, before the words "to announce" delete "antennas" and insert therefor --antenna--.

CERTIFICATE OF CORRECTION (continued)
U.S. Pat. No. 7,570,921 B2

IN THE CLAIMS

At claim 7, column 12, lines 5 & 6, after the word "functions" delete "[that include]".

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,570,921 B2 Page 1 of 1
APPLICATION NO. : 10/855279
DATED : August 4, 2009
INVENTOR(S) : Sugar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1337 days.

Signed and Sealed this

Seventh Day of September, 2010

David J. Kappos
*Director of the United States Patent and Trademark Office*